US008929299B2

(12) United States Patent
Matsumoto

(10) Patent No.: US 8,929,299 B2
(45) Date of Patent: *Jan. 6, 2015

(54) COMMUNICATIONS TERMINAL, SERVER, PLAYBACK CONTROL METHOD AND PROGRAM

(71) Applicant: Facebook, Inc., Menlo Park, CA (US)

(72) Inventor: Tetsuya Matsumoto, Kanagawa (JP)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/036,990

(22) Filed: Sep. 25, 2013

(65) Prior Publication Data

US 2014/0025779 A1 Jan. 23, 2014

Related U.S. Application Data

(60) Continuation of application No. 13/539,939, filed on Jul. 2, 2012, now Pat. No. 8,570,949, which is a (Continued)

(30) Foreign Application Priority Data

Jun. 25, 2004 (JP) .................................. 2004-188480
Jun. 25, 2004 (JP) .................................. 2004-188481

(51) Int. Cl.
H04W 4/00 (2009.01)
H04L 29/06 (2006.01)
G06Q 20/20 (2012.01)
G06Q 40/00 (2012.01)
H04M 1/725 (2006.01)
H04M 15/00 (2006.01)
H04N 1/00 (2006.01)
H04N 1/32 (2006.01)

(52) U.S. Cl.
CPC .............. *H04L 65/60* (2013.01); *G06Q 20/202* (2013.01); *G06Q 20/208* (2013.01);
(Continued)

(58) Field of Classification Search
USPC ........ 455/566, 412.1, 466, 459; 370/328, 338
See application file for complete search history.

(56) References Cited

U.S. PATENT DOCUMENTS 5,640,002 A 6/1997 Ruppert et al.
6,170,060 B1 1/2001 Mott et al.
(Continued)

FOREIGN PATENT DOCUMENTS

JP 2002094500 3/2002
JP 2002118680 4/2002
(Continued)

*Primary Examiner* — David Q Nguyen
(74) *Attorney, Agent, or Firm* — Sheppard Mullin Richter & Hampton LLP

(57) ABSTRACT

A communications terminal is provided, which includes a reading device which reads in access information recorded on a prescribed recording medium, the access information being necessary for acquiring content which can be played back by a playback device from a prescribed server via a network; and a playback control device which controls the playback device and the reading device. The playback control device controls receiving the content and metadata from the server, and playing back the content according to the metadata, if the content corresponding to the read access information is not stored in the storage device when the reading device reads in the access information; and the playback control device controls playing back the content stored in the storage device according to the metadata stored in the storage device in association with the content, if the content corresponding to the read access information is stored in the storage device.

20 Claims, 12 Drawing Sheets

Related U.S. Application Data continuation of application No. 13/022,109, filed on Feb. 7, 2011, now Pat. No. 8,238,291, which is a continuation of application No. 12/359,726, filed on Jan. 26, 2009, now Pat. No. 7,907,563, which is a division of application No. 11/166,381, filed on Jun. 27, 2005, now Pat. No. 7,502,344.

(52) U.S. Cl.
CPC ........... *G06Q 40/00* (2013.01); *H04M 1/72561* (2013.01); *H04M 15/68* (2013.01); *H04M 15/8242* (2013.01); *H04N 1/0044* (2013.01); *H04N 1/32101* (2013.01); *H04M 1/72558* (2013.01); *H04M 2215/0196* (2013.01); *H04M 2215/7846* (2013.01); *H04M 2250/64* (2013.01); *H04N 1/00307* (2013.01); *H04N 2201/0087* (2013.01); *H04N 2201/0089* (2013.01); *H04N 2201/3214* (2013.01); *H04N 2201/3215* (2013.01); *H04N 2201/3226* (2013.01); *H04N 2201/3246* (2013.01); *H04N 2201/3249* (2013.01); *H04N 2201/3269* (2013.01); *H04N 2201/3273* (2013.01); *H04N 2201/3274* (2013.01); *H04N 2201/3278* (2013.01); *Y10S 707/99933* (2013.01); *Y10S 707/99945* (2013.01); *Y10S 707/913* (2013.01)
USPC ........ 370/328; 370/338; 455/566; 455/412.1; 455/466; 455/459; 707/999.003; 707/999.104; 707/913

(56) References Cited

U.S. PATENT DOCUMENTS

| | | |
|---|---|---|
| 6,546,385 B1 | 4/2003 | Mao et al. |
| 7,191,216 B2 | 3/2007 | Mattila et al. |
| 8,238,291 B2 | 8/2012 | Matsumoto |
| 8,570,949 B2 * | 10/2013 | Matsumoto .................. 370/328 |
| 2002/0174269 A1 | 11/2002 | Spurgat et al. |
| 2004/0048602 A1 | 3/2004 | Tamura |
| 2004/0103217 A1 | 5/2004 | Kridner |
| 2004/0192358 A1 | 9/2004 | Lai et al. |
| 2006/0074985 A1 | 4/2006 | Wolfish et al. |

FOREIGN PATENT DOCUMENTS

| | | |
|---|---|---|
| JP | 2002123801 | 4/2002 |
| JP | 2002203070 | 7/2002 |

* cited by examiner

FIG.4

| 3480 | 3481 ORIGINAL INFORMATION (FIRST URL + id) | 3482 SECOND URL | 3483 id | 3489 ERROR CODE |
|---|---|---|---|---|
| | http://www.fujifilm.co.jp/?id=93ab5 | scratchpad://;pos=0 | 93ab5 | 00 |
| | http://www.xfilm.co.jp/?id=7d12r | (null) | 7d12r | E2 |
| | ... | ... | ... | ... |

| ID |
|---|
| VERSION |
| CONTENT ACQUISITION DATE |
| PLAYBACK VALIDITY TERM |
| DATE/TIME OF NEXT UPDATE |
| PERMITTED FREQUENCY OF PLAYBACK |

FIG.8

| ID | VERSION | CONTENT ACQUISITION DATE (MOST RECENT UPDATE DATE/TIME) | PLAYBACK VALIDITY TERM | DATE/TIME OF NEXT UPDATE | PERMITTED FREQUENCY OF PLAYBACK | ORIGINAL INFORMATION OF TWO-DIMENSIONAL BARCODE |
|---|---|---|---|---|---|---|
| 12345 | 0001 | 2004/03/15 15:00:20 | 2004/05/15 23:59:59 | | 12 | http://... |
| 23456 | 0001 | 2004/03/15 15:00:20 | 2004/05/15 23:59:59 | 2004/04/15 00:00:00 | 5 | http://... |
| 78912 | 0001 | 2004/03/15 15:00:20 | 2004/05/15 23:59:59 | | 8 | http://... |
| | | | | | | |

3480

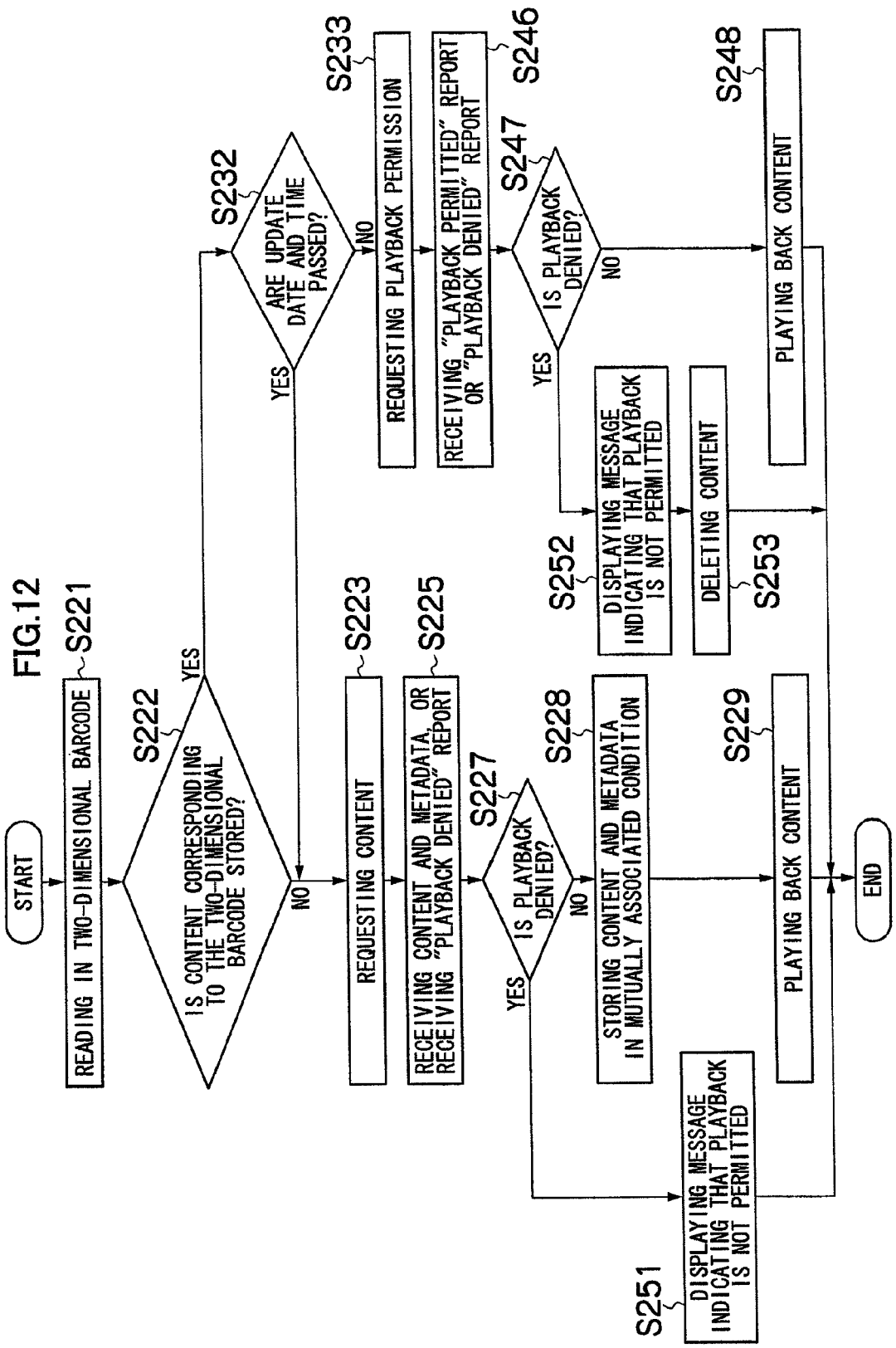

COMMUNICATIONS TERMINAL, SERVER, PLAYBACK CONTROL METHOD AND PROGRAM

CROSS-REFERENCE TO RELATED APPLICATIONS

This application is a continuation of U.S. patent application Ser. No. 13/539,939, filed Jul. 2, 2012, now U.S. Pat. No. 8,570,949; which is a continuation of U.S. patent application Ser. No. 13/022,109, filed Feb. 7, 2011, now U.S. Pat. No. 8,238,291; which is a continuation of U.S. patent application Ser. No. 12/359,726, filed on Jan. 26, 2009, now U.S. Pat. No. 7,907,563; which is a divisional of application Ser. No. 11/166,381 filed Jun. 27, 2005, now U.S. Pat. No. 7,502,344; which claims priority from Japanese Patent Application Nos. 2004-188480 and 2004-188481, filed Jun. 25, 2004; each of which is incorporated herein by reference in its entirety.

BACKGROUND OF THE INVENTION

1. Field of the Invention

The present invention relates to a communications terminal, server, playback control method and program, and more particularly, to a communications terminal which acquires content via communications, a server which provides the content to the communications terminal by communications, and a method and program for controlling playback of the content.

2. Description of the Related Art

Mobile telephones which download various types of content, such as images, sound information or text information, via radio communications, and then playback such content, have become widespread.

Incidentally, it is known that two-dimensional barcodes, such as a QR code (registered trademark), are used when downloading content.

For example, Japanese Patent Application Publication No. 2002-118680 discloses a method that a general user can obtain readily detailed information relating to an advertisement placed on a network, by reads the two-dimensional barcode, which is printed on an advertising medium distributed to the general user, into a mobile telephone of the general user.

On the other hand, it is also known that the playback of content is restricted.

Japanese Patent Application Publication No. 2002-203070 discloses a method that confirms whether or not the decryption key is present in a home memory when an encrypted content is received from a server, and then requests the decryption key from a server if the decryption key is not present.

Japanese Patent Application Publication No. 2002-94500 discloses a device that reads in conditions for which playback of data is permitted, such as the devices, date and time, time period, and the like, from a recording medium in addition to the data to be played back, and then permits or restricts the playback of the data which is read from the recording medium in accordance with the conditions read in from the recording medium.

Japanese Patent Application Publication No. 2002-123801 discloses a system which defines conditions, reception restrictions, and the like on a broadcasting side, delivers the definition details together with content to a receiving side by broadcast, and then controls for viewing or listening to a viewer or listener according to the definition details, so as to protect the copyright of the creator.

However, when playing back content, which is downloaded corresponding to two-dimensional barcode from a prescribed server by reading in a two-dimensional barcode to a mobile telephone, on the mobile telephone, the user has to wait from the start until the end of downloading the content, generally.

Particularly, when the content is downloaded via radio communications, it takes considerable time to access the relevant server and download the content, compared to wired communications. Therefore, there is a problem in that a long waiting time is required until the content starts to be played back. In addition, the radio communications by a mobile telephone depends on the communications environment, and then it may not be possible to download content depending on the communications environment. Therefore, it may not be possible to playback the content.

Furthermore, a moving image playback device, conventionally, stores a permitted frequency of playback and the playback validity term within the moving image content, in the case in which the playback is limited in terms of the permitted frequency of playback and the playback validity term. In the case in which a permitted frequency of playback and a playback validity term are stored inside the moving image content in this manner, when the permitted frequency of playback or the playback validity term are to be changed, it become necessary to recreate the actual moving image content. If the moving image content is then recreated, it becomes necessary to download the moving image content to the playback device, again.

SUMMARY OF THE INVENTION

The present invention has been implemented taking into account the above described circumstances, and an object thereof is to provide a communications terminal, a server, a playback control method and program that can prevent the occurrence of redundant communications between a communications terminal which receives and plays back content, and a server which transmits content.

In order to attain the aforementioned object, the present invention is directed to a communications terminal comprising: a playback device which playbacks content; a reading device which reads in access information recorded on a prescribed recording medium, the access information being necessary for downloading the content which can be played back by the playback device, via a network; a communications device which downloads via communications the content corresponding to the access information according to the access information read in; a storage device which stores the downloaded content, the storage device storing details of the access information in association with the content, the details of the access information being used in downloading the content; a judging device which judges whether or not the content corresponding to the read access information is present in the storage device, according to information which is stored in the storage device, when the access information is read in by the reading device; and a control device which controls the playback device, the reading device, the communications device, the storage device, and the judging device, wherein: if the judging device judges that the content is present in the storage device, the control device controls for acquiring the content corresponding to the access information read in from the storage device, and for playing back the content; and if the judging device judges that the content is not present in the storage device, the control device controls for downloading the content corresponding to the access information read in, and for playing back the content.

According to the present invention, it is possible to judge whether or not content corresponding to the access information is present in the storage device, according to the access information read in. At that time, if the content is present in the storage device, the content is played back without downloading by means of the communications device. Therefore, it is possible to reduce the waiting time until starting to play back the content, while reducing communications costs.

Preferably, the reading device reads in at least one of the access information in a form of a two-dimensional barcode which is printed on the recording medium, information which is stored on an IC tag attached to the recording medium, and digital watermark information which is contained in an image printed on the recording medium.

Preferably, the information stored in the storage device in association with the content contains at least one of a URL (Uniform Resource Locator), identification information corresponding to the content, and a combination thereof.

The present invention is also directed to the communications terminal further comprising a display device which displays an error message in at least one of cases as following: (1) a case in which the storage device does not have spare capacity to store the content which is to be downloaded when downloading content, (2) a case in which the terminal is out of a communications range, and (3) a case in which download of the content is halted.

The present invention is also directed to the communications terminal wherein: the storage device stores the details of the read access information, in at least one of cases as following: (1) a case in which it is not possible to start download of the content, and (2) a case in which download of the content is halted; and the control device controls for starting download of the content according to the information stored in the storage device even if the access information is not re-read in.

In order to attain the aforementioned object, the present invention is directed to a playback control method which controls a prescribed communications terminal for downloading content which can be played back by the communications terminal from a prescribed server via a network, and playing back the downloaded content; comprising the steps of: reading in access information necessary for downloading the content, the access information being recorded on a prescribed recording medium; storing the downloaded content into a prescribed storage device inside the communications terminal, by using the read access information; storing details of the access information into the storage device in association with the downloaded content, the details of the access information being used in downloading the content; judging whether or not the content corresponding to the read access information is present in the storage device according to information stored in the storage device, when the access information is re-read in; and playing back the content corresponding to the read access information which is stored in the storage device, if it is judged that the content is present in the storage device.

The present invention is also directed to the playback control method further comprising a step of: displaying an error message, in at least one of cases as following: (1) a case in which the storage device does not have spare capacity to store the content that is to be downloaded when downloading content (2) a case in which the terminal is out of the communications range, and (3) a cases in which download of the content is halted.

The present invention is also directed to the playback control method further comprising the steps of: storing the details of the read access information, in at least one of cases as following: (1) a case in which it is not possible to start download of the content, and (2) a case in which download of the content is halted; and executing a download of the content according to the information stored in the storage device, even if the access information is not re-read in.

In order to attain the aforementioned object, the present invention is directed to a computer readable medium having embodied thereon a computer program for processing by a computer, the computer program comprising: a first code segment for reading in access information necessary for downloading the content, the access information being recorded on a prescribed recording medium; a second code segment for storing the downloaded content into a prescribed storage device inside the communications terminal, by using the read access information; a third code segment for storing details of the access information into the storage device in association with the downloaded content, the details of the access information being used in downloading the content; a fourth code segment for judging whether or not the content corresponding to the read access information is present in the storage device according to information stored in the storage device, when the access information is re-read in; and a fifth code segment for playing back the content corresponding to the read access information which is stored in the storage device, if it is judged that the content is present in the storage device.

The present invention is also directed to the medium the computer program further comprising: a sixth code segment for displaying an error message, in at least one of cases as following: (1) a case in which the storage device does not have spare capacity to store the content that is to be downloaded when downloading content (2) a case in which the terminal is out of the communications range, and (3) a cases in which download of the content is halted.

The present invention is also directed to the medium the computer program further comprising: a seventh code segment for storing the details of the read access information, in at least one of cases as following: (1) a case in which it is not possible to start download of the content, and (2) a case in which download of the content is halted; and an eighth code segment for executing a download of the content according to the information stored in the storage device, even if the access information is not re-read in.

The present invention is also directed to the medium wherein the medium is a propagated signal.

The present invention is also directed to the medium wherein the propagated signal is a carrier wave.

In order to attain the aforementioned object, the present invention is directed to a communications terminal, comprising: a playback device which playbacks content; a reading device which reads in access information recorded on a prescribed recording medium, the access information being necessary for acquiring the content which can be played back by the playback device from a prescribed server via a network; a content requesting device which requests the content corresponding to the read access information, from the server; a receiving device which receives metadata together with the content from the server, the metadata containing playback control information for the requested content; a storage device which stores the received content and the metadata in a mutually associated condition; and a playback control device which controls the playback device, the reading device, the content requesting device, the receiving device, and the storage device, wherein: the playback control device controls for receiving the content and the metadata from the server, and for playing back the content according to the metadata, if the content corresponding to the read access information is not stored in the storage device when the reading device reads in the access information; and the playback control device controls for playing back the content stored in the storage device according to the metadata stored in the storage device in association with the content, if the content corresponding to the read access information is stored in the storage device.

Preferably, the playback control information contains at least one of a frequency of permitted playback and a validity term of playback relating to the content.

According to the present invention, metadata, including playback conditions information such as a permitted frequency of playback and the playback validity term, is created in the server separately from content such as sound information or moving images, and then the metadata is sent to the communications terminal together with the content. Therefore, it is possible to control playback of content in the communications terminal according to the metadata when the communications terminal has requested the content. In addition, if the metadata is changed in the server, the content is not affected at all. Furthermore, since the content is not acquired from the server each time the access information is read in, then there is no occurrence of wasteful communications.

In order to attain the aforementioned object, the present invention is directed to a communications terminal, comprising: a playback device which playbacks content; a reading device which reads in access information recorded on a prescribed recording medium, the access information being necessary for acquiring the content which can be played back by the playback device from a prescribed server via a network; a content requesting device which requests the content corresponding to the read access information to the server; a receiving device which receives metadata together with the content from the server, the metadata containing update control information for the requested content; a storage device which stores the received content and the metadata in a mutually associated condition; and an update control device which controls for requesting updating of the content to the server according to the update control information, for updating the new content requested updating, and for storing the new updated content which is received from the server by the receiving device.

Preferably, the update control information contains date/time of next update.

According to the present invention, metadata, including update conditions information such as the date/time of next update, is created in the server separately from the content, such as sound information or moving images, and then the metadata is sent to the communications terminal together with the content. Therefore, it is possible to control update of the content in the communications terminal according to the above metadata when the communications terminal has requested content. More specifically, the content can be updated with reporting content update from the server side. In addition, since the communications terminal does not make an inquiry to the server after acquiring the content, until it performs an update, there is no occurrence of wasteful communications.

The present invention is also directed to a server which delivers content to a server which delivers content to the communications terminal as described above of an access source, when access is received via a network from the communications terminal, comprising: an order receiving device which receives an order for recording an image onto a prescribed recording medium; a first database which manages the content relating to the image, the content being delivered to the communications terminal; a second database which manages metadata in association with the content managed by the first database; an instruction information creating device which creates instruction information, the instruction information causing the access information to be recorded onto the prescribed recording medium together with the image, the access information being necessary for the communications terminal to acquire the content; an access information receiving device which receives the access information from the communications terminal, when the access information recorded on the recording medium is read in by the communications terminal; and a delivery device which delivers the content corresponding to the received access information, and the metadata to the communications terminal of the access source, the content being managed by the first database, the metadata being managed by the second database in association with the content.

The present invention is also directed to the server wherein: the access information receiving device acquires current date and time information managed by the communications terminal from the communications terminal; and if the delivery device judges that current data and time information managed by the communications terminal does not match current date and time information managed by the server, then the delivery device prohibits the communications terminal from playing back the content.

The present invention is also directed to the server further comprising a billing device which performs billing processing according to the metadata.

According to the present invention, it is possible to control a playback and an update accurately, even if the date and time information, which are managed by the communications terminal, have been changed deliberately by the user.

The present invention is also directed to a server, comprising: an order receiving device which receives an order for recording an image onto a prescribed recording medium; a first database which manages content relating to the image, the content being delivered to a prescribed communications terminal; a second database which manages metadata in association with the content, the metadata containing playback conditions for playback of the content by the communications terminal; an instruction information creating device which creates instruction information for causing access information to be recorded onto the recording medium together with the image, the access information being necessary for the communications terminal to acquire the content; an access information receiving device which receives the access information from the communications terminal, when the access information recorded on the recording medium is read in by the communications terminal; a judging device which judges whether to deliver the content and the metadata corresponding to the received access information; a searching device which searches the first database for the content corresponding to the access information, while searching the second database for the metadata corresponding to the access information; and a delivery device which delivers both the content and the metadata to the communications terminal of an access source if the judging device judges to deliver both the content and the metadata, and which delivers only the metadata to the communications terminal of the access source if the judging device judges to deliver the metadata only, according to the judgment result of the judging device.

The present invention is also directed to the server wherein: the access information receiving device acquires current date and time information managed by the communications terminal from the communications terminal; and if current data and time information managed by the communications ter- minal does not match current date and time information managed by the server, then the judging device prohibits the communications terminal from playing back the content.

The present invention is also directed to the server further comprising a billing device which performs billing processing according to the metadata.

According to the present invention, by this configuration, it is possible to perform billing, according to a permitted frequency of playback, the playback validity term, and other playback control information, or update control information. For example, rather than billing a certain price for one song, it is possible to bill a certain price to playback one song a certain number of times. Additionally, it is possible to bill a certain price to playback same one song until the end of a particular month, for example. Furthermore, it is also possible to bill a certain price to update same one song a certain number of times, for example.

In order to attain the aforementioned object, the present invention is directed to a playback control method, comprising the steps of: reading in access information recorded on a prescribed recording medium; judging whether or not content corresponding to the access information is stored in a prescribed storage device; acquiring the content and metadata via a network from a prescribed server, if the content corresponding to the read access information is not stored in the storage device when the access information is read in, the metadata containing playback control information for the content; storing the content and the metadata acquired in the acquiring step in a mutually associated condition in the storage device; and playing back the content which is stored in the storage device, according to the metadata stored in the storage device in association with the content.

The present invention is also directed to a playback control method, comprising the steps of: reading in access information recorded on a prescribed recording medium; judging whether or not content corresponding to the access information is stored in a prescribed storage device; acquiring the content and metadata via a network from a prescribed server, if the content corresponding to the read access information is not stored in the storage device when the access information is read in, the metadata containing update control information for the content; updating the content stored in the storage device according to the metadata stored in the storage device in association with the content; and playing back the content stored in the storage device.

In order to attain the aforementioned object, the present invention is directed to a computer readable medium having embodied thereon a computer program for processing by a computer, the computer program comprising: a first code segment for reading in access information recorded onto a prescribed recording medium; a second code segment for judging whether or not content corresponding to the access information is stored in a prescribed storage device; a third code segment for acquiring the content and metadata via a network from a prescribed server, if the content corresponding to the read access information is not stored in the storage device when the access information is read in, the metadata containing playback control information for the content; a fourth code segment for storing the content and metadata, which are acquired, in a mutually associated condition in the storage device; and a fifth code segment for playing back the content which is stored in the storage device, according to the metadata stored in the storage device in association with the content.

In order to attain the aforementioned object, the present invention is directed to a computer readable medium having embodied thereon a computer program for processing by a computer, the computer program comprising: a first code segment for reading in access information recorded on a prescribed recording medium; a second code segment for judging whether or not content corresponding to the access information is stored in a prescribed storage device; a third code segment for acquiring the content and metadata via a network from a prescribed server, if the content corresponding to the read access information is not stored in the storage device when the access information is read in, the metadata containing playback control information for the content; a fourth code segment for storing the content and the metadata acquired in the acquiring step in a mutually associated condition in the storage device; and a fifth code segment for playing back the content which is stored in the storage device, according to the metadata stored in the storage device in association with the content.

In order to attain the aforementioned object, the present invention is also directed to a computer readable medium having embodied thereon a computer program for processing by a computer, the computer program comprising: a first code segment for reading in access information recorded on a prescribed recording medium; a second code segment for judging whether or not content corresponding to the access information is stored in a prescribed storage device; a third code segment for acquiring the content and metadata via a network from a prescribed server, if the content corresponding to the read access information is not stored in the storage device when the access information is read in, the metadata containing update control information for the content; a fourth code segment for updating the content stored in the storage device according to the metadata stored in the storage device in association with the content; and a fifth code segment for playing back the content stored in the storage device.

The present invention is also directed to the medium wherein the medium is a propagated signal.

The present invention is directed to the medium wherein the propagated signal is a carrier wave.

As described above, according to the present invention, it is possible to prevent the occurrence of redundant communications between a communications terminal which receives and plays back content, and a server which delivers the content.

BRIEF DESCRIPTION OF THE DRAWINGS

The nature of this invention, as well as other objects and advantages thereof, will be explained in the following with retrieve to the accompanying drawings, in which like retrieve characters designate the same or similar parts throughout the figures and wherein:

FIG. 4 is a plan view showing an example of a management table according to the embodiment;

FIG. 7 is a plan view showing an example of metadata according to the embodiment;

FIG. 8 is a plan view showing an example of a metadata management table according to the embodiment;

FIG. 12 is a flowchart showing the sequence of the processing of a mobile telephone in service processing according to the second embodiment.

DETAILED DESCRIPTION OF THE PREFERRED EMBODIMENTS

Figure 1:
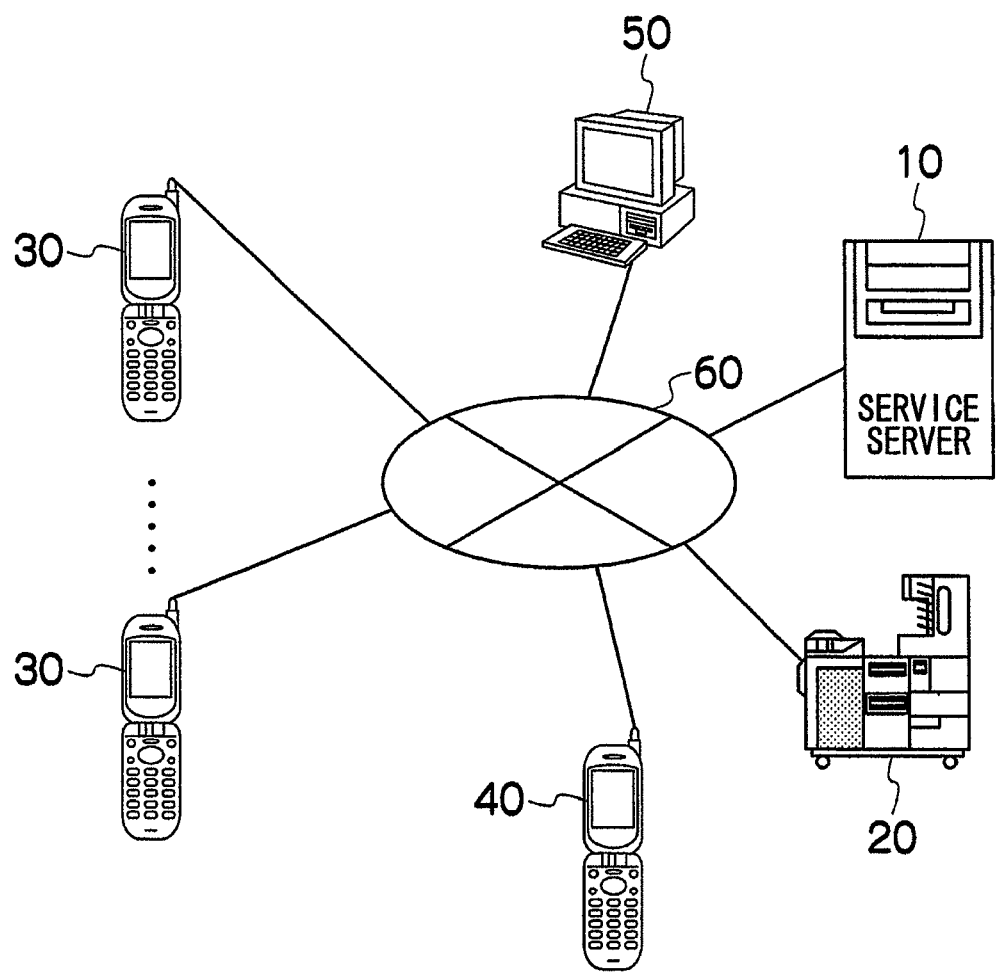
FIG. 1 is a general compositional diagram of a service system comprising a mobile telephone, according to an embodiment of the present invention.

FIG. 1 is a general compositional diagram of a service system comprising mobile telephones 30 and 40 and a service server 10 according to an embodiment of the present invention. As shown in FIG. 1, a service system comprises: mobile telephones 30 and 40; a service server 10; a printer 20; and a personal computer (hereafter, abbreviated to "PC") 50, which are connected respectively to a network 60.

The service server 10 communicates with the printer 20, the mobile telephones 30 and 40, the PC 50, via the network 60. The service server 10 performs services as following: a printing service which creates a photographic print according to an order from a user; a registration service which stores registered information relating to an image to be printed for a prescribed period of time; a delivery service which delivers stored registered information; and other types of services.

Herein, registered information comprises sound information, text information, moving image information, or other digital content (hereafter referred to simply as "content").

Figure 2:
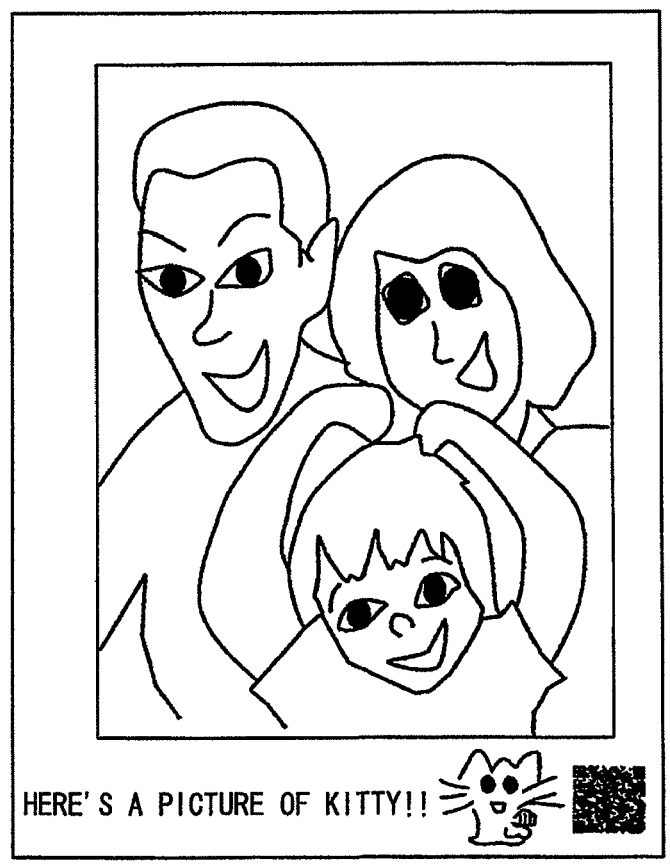
FIG. 2 is a plan view showing an example of a photographic print according to the embodiment.

The printer 20 creates a photographic print 26 shown in FIG. 2 in accordance with control implemented by the service server 10. In the photographic print 26, a two-dimensional barcode 27 such as a QR code (registered trademark) is printed together with the image 28 which has been ordered for printing.

The mobile telephones 30 and 40 are able to photograph a subject. The mobile telephones 30 and 40 are also designed so as to be able to photograph and decode a two-dimensional barcode, and to access the service server 10 via the network 60 according to the result of the decoding. The mobile telephones 30 and 40 are actually connected to a base station (not shown in FIG. 1) by means of radio communications, and are connected to a wired network 60 via the base station. The telephones 30 and 40 are connected to the service server 10 via a network 60.

In FIG. 1, only two mobile telephones 30, one mobile telephone 40, and one PC 50 are shown, but a plurality of user terminals are actually connected to the network 60.

Herein, the mobile telephone 40 and the PC 50 are user terminal devices for uploading images and registered information to the service server 10, and are owned by the user placing an order for a print. The mobile telephone 30 is a user terminal device for downloading registered information from the service server 10, and it is owned by the user to whom the photographic print is to be delivered.

For convenience in description of the print service provided by the service server 10, when the service server 10 receives the upload of an image to be printed from the mobile telephone 40 or the PC 50, the service server 10 issues identification information, generates access information containing the identification information, and then prints the generated access information in the form of a two-dimensional barcode onto prescribed paper, together with the image. Herein, access information is information which is required in order for the mobile telephone 30 to connect to the service server 10 via the network 60 by radio communications, and to download the registered information. For example, it contains a URL (Uniform Resource Locator) and identification information relating to the registered information. The identification information is information for identifying the image which is printed in a photographic print by uploading as well as being information for identifying the registered information.

In addition, for convenience in description of the registration service provided by the service server 10, when the service server 10 receives the upload of registered information relating to an image to be printed from the mobile telephone 40 or the PC 50, the service server 10 registers the registered information in a prescribed database in association with identification information.

Furthermore, for convenience in description of the delivery service of the service server 10, when the service server 10 is accessed with the mobile telephone 30 by using the two-dimensional barcode on a photographic print, the registered information to be downloaded is identified according to the identification information received from the mobile telephone 30, and then the registered information is downloaded to the mobile telephone 30 which has accessed the service server 10.

First, a service system according to a first embodiment of the present invention is described below.

Figure 3:
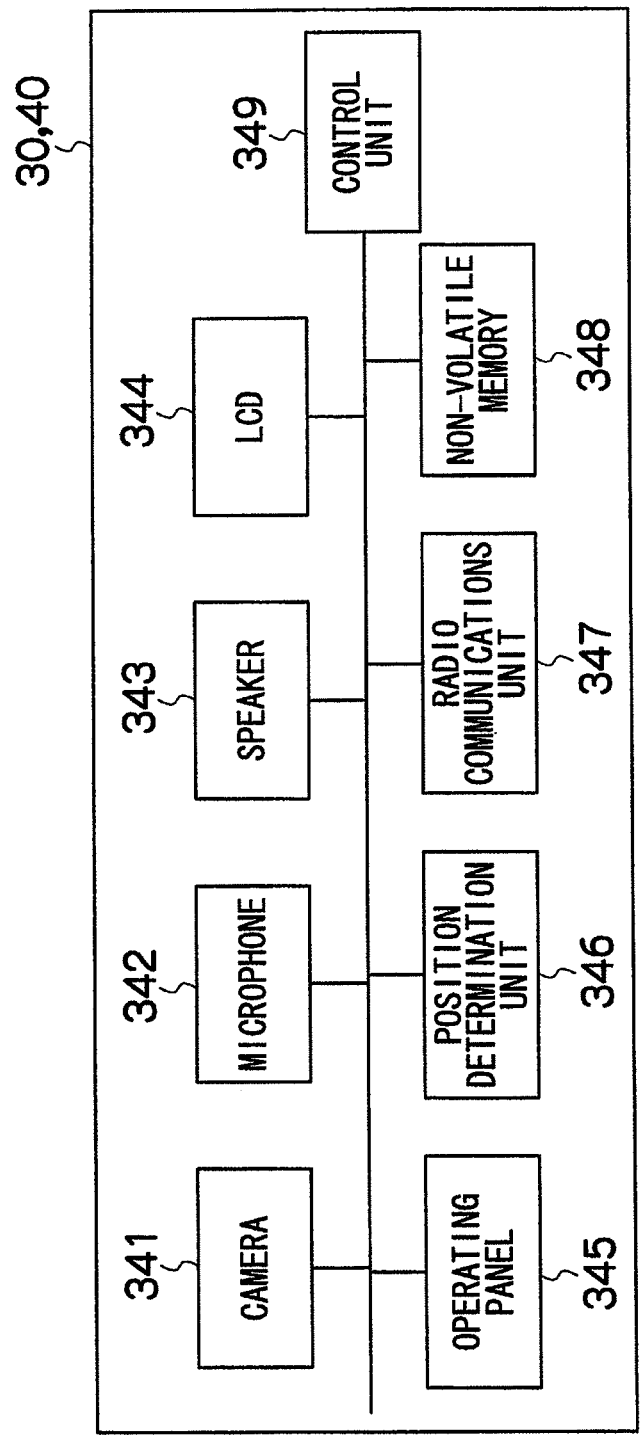
FIG. 3 is a block diagram of an internal composition of a mobile telephone according to the embodiment.

FIG. 3 is a schematic block diagram showing the internal composition of the mobile telephones 30 and 40. As shown in FIG. 3, the mobile telephones 30 and 40 comprises: a camera 341; a microphone 342; a speaker 343; a liquid crystal display (LCD) 344; an operating panel 345; a position determination unit 346; a radio communications unit 347; a non-volatile memory 348; and a control unit 349.

The camera 341 is used to read in a two-dimensional barcode as well as photographing a subject. The microphone 342 is used for inputting sound information, which is one type of registered information as well as holding a conversation. The speaker 343 is used for outputting sound information, which is one type of registered information as well as holding a conversation. The LCD 344 is used for outputting text information, moving image information, and other registered information, as well as being used for displaying captured images, electronic mail, and various types of operating screens. The operating panel 345 is used for inputting text information which is one type of registered information, as well as inputting telephone numbers, the content of an electronic mail, and the like. The position determination unit 346 determines the current position of the mobile telephones 30 and 40 by using a GPS (Global Positioning System).

The radio communications unit 347 communicates with other mobile telephones and with the service server 10 connected to the network 60 by performing radio communications via a base station (not illustrated in the drawings). In the present embodiment, firstly, an image to be printed is uploaded to the service server 10, and a print of the uploaded image is ordered. Secondly, registered information relating to the image to be printed is uploaded to the service server 10, and storage of the registered information relating to the image to be printed is requested. Finally, the registered information is downloaded from the service server 10 by means of the two-dimensional barcode.

The non-volatile memory 348 stores: a control program for controlling the various sections of the mobile telephones 30 and 40; content downloaded via the network 60; a management table for controlling playback; and other various types of information.

The control unit 349 executes the program and performs overall control of the respective units of the mobile telephones 30 and 40. More specifically, when a two-dimensional barcode has been read in by the camera 341, the control device 349 judges whether or not content corresponding to the read in two-dimensional barcode is present in the non-voltage memory 348, according to the information stored in the non-volatile memory 348. If the content is judged to be present in the non-volatile memory 348, then the content corresponding to the read in two-dimensional barcode is read out from the non-volatile memory 348, and is played back by means of the LCD 344 and speaker 343, and the like. On the other hand, if the content is judged not to be present in the non-volatile memory 348, then the content corresponding to the read in two-dimensional barcode is downloaded from the radio communications unit 347 and is played back by means of the LCD 344 and speaker 343, and the like. In addition, the control unit 349 displays an error message on the LCD 344, if the non-volatile memory 348 does not have sufficient spare storage capacity for the content that is to be downloaded, if the terminal is out of range, or if the download of the content is interrupted. Furthermore, the control unit 349 stores the content of the read in two-dimensional barcode in the non-volatile memory 348, if it is impossible to start download of content, or if download of content is interrupted. Therefore, even if the two-dimensional barcode is not re-read in, it starts to download the content to the radio communications unit 347 according to the information stored in the non-volatile memory 348.

In the present embodiment, the playback device according to the present invention is composed of the speaker 343 and the LCD 344. In addition, the reading device according to the present invention is composed of the camera 341. Furthermore, the communications device according to the present invention is composed of the radio communications unit 347. Moreover, the storage device according to the present invention is composed of the non-volatile memory 348, and the judgment device. Additionally, the control device according to the present invention is composed of the control unit 349.

FIG. 4 is a plan view showing an example of a management table 3480 managed by the mobile telephone 30. As shown in FIG. 4, this management table 3480 comprises information relating to the acquisition of content, such as original information (including a first URL and identification information id) 3481, a second URL 3482, identification information (id) 3483, an error code 3489, and the like. The URL comprises a first URL (including 3481) which is used when downloading content from the service server 10, and a second URL 3482 which is used when acquiring content stored in the non-volatile memory 348 of the mobile telephone, from the non-volatile memory 348.

The first URL (in the original information 3481) is information which is generated by the service server 10. When the two-dimensional barcode is read in and decoded, the first URL is registered in the management table 3480. In the first URL (in the original information 3481), the protocol for acquiring the content is indicated as "http".

The second URL 3482 is information which is generated by the mobile telephone 30. When content is downloaded from the service server 10 and stored in the non-volatile memory 348 (more specifically, on a scratchpad), the second URL 3482 is registered in the management table 3480. In the second URL 3482, the protocol for acquiring the content is indicated as "scratchpad".

The identification information 3483 is information which is issued corresponding to content by the service server 10. When a two-dimensional barcode is read in and is decoded, the identification information is extracted from the original information 3481 obtained by this decoding process, and then is registered in the management table 3480.

The error code 3489 is information which is generated by the mobile telephone 30. If download of content completes normally and the content is stored in the non-volatile memory 348, then a code (for example, "00") indicating normal termination is registered in the management table 3480. On the other hand, if it is impossible to start download of the content, or if the download of the content is interrupted, then a code indicating abnormal termination (for example, "E1", "E2", "E3", or the like), is registered in the management table 3480.

Furthermore, when the mobile telephone 30 accesses the service server 10, the mobile telephone 30 sends an HTTP request comprising a first URL and original information 3481 containing identification information 3483, for instance "http://www.fujifilm.co.jp/?id=93ab5". In this case, the identification information 3483 is "93ab5". The identification information 3483 is actually generated in encrypted form by the service server 10. When the service server 10 receives the identification information 3483 from the mobile telephone 30, it is encrypted by the service server 10. For example, the encrypted information "93ab5" is decoded as "12345".

Figure 5:
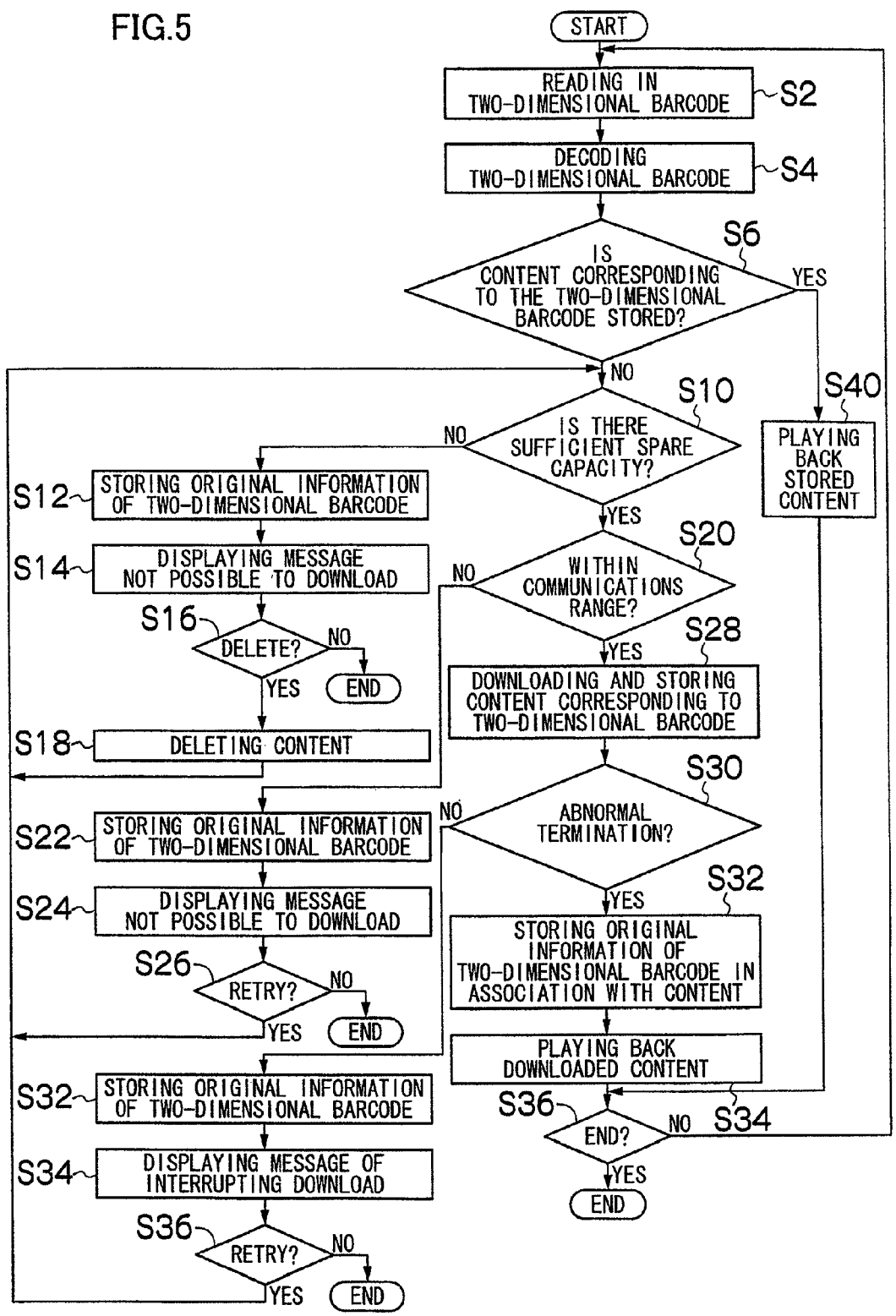
FIG. 5 is a flowchart showing the sequence of playback control processing according to the embodiment.

Next, the sequence of playback control processing performed by the mobile telephone 30 according to the present embodiment is described detail with reference to FIG. 5. Each of the steps in FIG. 5 is executed by the control unit 349 of the mobile telephone 30, in accordance with a program stored in the non-volatile memory 348 of the mobile telephone 30.

First, when a two-dimensional barcode read out start instruction is inputted by starting up a prescribed application program by means of the user operating the operating panel 345 of the mobile telephone 30, the two-dimensional barcode is photographed by the camera 341 of the mobile telephone 30 (S2) and decoded (S4).

More specifically, when a two-dimensional barcode is photographed with camera 341, the mobile telephone 30 obtains bitmap information for a two-dimensional matrix comprising "0" and "1" bit rows. By decoding this bitmap information by means of a previously determined prescribed decoding method, the mobile telephone 30 obtains original information including the first URL and the identification information id (the information prior to encrypting into the two-dimensional barcode).

Next, the mobile telephone 30 judges whether or not content corresponding to the read in two-dimensional barcode is stored in the scratchpad (S6).

Incidentally, the scratchpad is a storage region within the non-volatile memory 348 of the mobile telephone 30, and this storage region is allocated for each application program. The content downloaded via the network 60 and a management table 3480 as shown in FIG. 4 is stored in the scratchpad. The mobile telephone 30 judges whether or not the content to be played back is stored in the scratchpad, according to the management table 3480.

More specifically, first, the identification information id (for example, "93ab5") is extracted from the original information of the two-dimensional barcode (for example, "http://www.fujifilm.co.jp/?id=93ab5"). It is judged whether or not the identification information id is registered in the management table 3480. Next, it is judged whether or not the second URL 3482 associated with that identification information id is registered in the management table 3480. At this time, if the second URL is not registered (if the second URL has a null value), then it is judged that the content corresponding to the read in two-dimensional barcode is not stored in the scratchpad.

Instead of judging whether or not the identification information id is registered in the management table 3480, it is also possible to judge whether or not the original information itself has been registered in the management table 3480. In addition, it is also possible to judge whether or not bitmap information is registered in such a manner that the actual bitmap information of the two-dimensional barcode is managed by the management table 3480. Furthermore, instead of judging whether or not a second URL 3482 is registered in the management table 3480, it is also possible to judge whether or not the error code 3489 is "00" indicating normal termination.

When a user receiving a photographic print 26 shown in FIG. 2 reads in the two-dimensional barcode 27 on the photographic print 26 to the user's mobile telephone 30, the identification information id (for example, "93ab5") contained in the read two-dimensional barcode 27 is not yet actually registered in the management table 3480. In cases of this kind, it is judged that the content corresponding to the read two-dimensional barcode 27 is not stored in the scratchpad. Furthermore, when the download of the content is failure as described below, the second URL 3482 is not yet registered in the management table 3480 even if the two-dimensional barcode 27 is read in. In cases of this kind, it is also judged that the content corresponding to the read two-dimensional barcode 27 is not stored in the scratchpad.

If it is judged that the content corresponding to the read in two-dimensional barcode is not present in the scratchpad, then the content corresponding to the two-dimensional barcode is downloaded from the service server 10, according to the original information of the read in two-dimensional barcode.

More specifically, firstly, it is judged whether or not the scratchpad has sufficient spare capacity to store the content that is to be downloaded (S10). At this time, when there is insufficient capacity in the scratchpad, an error code (for example, "E1"), which indicates the reason why download cannot be executed, is set in the management table 3480 in association with the original information 3481 of the two-dimensional barcode (S12). At the same time, a message indicating that download is not possible due to lack of space in the scratchpad is displayed on the LCD 344 of the mobile telephone 10 (S14). In time, the user of the mobile telephone 30 is able to indicate whether or not the separate content stored in the scratchpad is to be deleted. The mobile telephone 30 judges whether or not there is a deletion instruction (S16). If a deletion instruction is inputted, it deletes the content (S18). Simultaneously with this deletion of the content, the corresponding line (original information 3481, second URL 3482, identification information 3483, error code 3489, and the like) is deleted from the management table 3480.

At the step (S10) for judging the spare capacity, when it is judged that there is sufficient spare capacity, it is also judged whether or not the mobile telephone 30 is situated within the communications range (S20). At this time, if the mobile telephone is out of range, then an error code (for example, "E2"), which indicates the reason why download cannot be executed, is registered in the management table 3480 in association with the original information 3481 of the two-dimensional barcode (S22). In time, a message indicating that download is not possible because the mobile telephone is out of range is displayed on the LCD 344 of the mobile telephone 30 (S24). The user of the mobile telephone 30 can instruct whether or not to retry the download (S26).

At the step (S20) for determining whether or not the mobile telephone is in the communications range, when it is judged that the telephone is in range, the content corresponding to the two-dimensional barcode is downloaded from the service server 10 by means of radio communications (S28), in the case of no other cause impeding the download. At this time, the downloaded content is stored in the scratchpad.

Incidentally, it may happen that the download is interrupted due to a cause such as a sudden change in the communications environment during downloading the content. In this case, when the download terminates, it is judged whether or not there has been an abnormal termination (S30). If there is an abnormal termination, then an error code (for example, "E3"), which indicates a download interruption, is registered in the management table 3480 in association with the original information 3481 of the two-dimensional barcode (S32). At the same time, a message indicating that the download has been interrupted is displayed on the LCD 344 of the mobile telephone 10 (S34). The user of the mobile telephone 30 can instruct whether or not to retry the download (S36).

If the download of the content has terminated normally, the original information of the two-dimensional barcode that has been read in is stored in the scratchpad in association with the content (S32). More specifically, the original information 3481 of the two-dimensional barcode, the second URL 3482, and the identification information id 3483 are set in a mutually associated condition in the management table 3480 shown in FIG. 4. A "00" indicating a normal termination is set as the error code 3489.

If the download of content terminates normally, then the content thus downloaded is played back (S34). For example, in the case in which a photographic print 26 shown in FIG. 2 is delivered, when the two-dimensional barcode 27 on that photographic print 26 is read in to the mobile telephone 30, the registered information (sound information, moving image information, text information, and other registered information) related to the image 28 in the photographic print 26 is downloaded from the service server 10, and is played back on the mobile telephone 30. For example, it is possible to hear the voice of a relative who is depicted on the photographic print 26. In addition, it is also possible to view a moving image of that relative, and a text message inputted by that relative.

After playback of the content is completed, the user selects whether or not to terminate the application program (S36). At this time, the two-dimensional barcode on the same photographic print, or the two-dimensional barcode on another photographic print can be read in, and the content corresponding to that two-dimensional barcode can be played back. In this case, while the two-dimensional barcode is read out (S2), the two-dimensional barcode is decoded (S4), and then it is judged whether or not the content corresponding to the two-dimensional barcode is stored in the scratchpad (S6).

At this time, if the content corresponding to the read two-dimensional barcode is stored in the scratchpad, then the content is not downloaded, and the content already stored in the scratchpad is played back (S40).

For example, firstly, the identification information id (for example, "93ab5") is extracted from the original information obtained by reading and decrypting the two-dimensional barcode (for example, "http://www.fujifilm.co.jp/?id=93ab5"). It is judged whether or not the identification information id is registered in the management table 3480. If the two-dimensional barcode has already been read in, then the identification information id is registered in the management table 3480. Next, it is judged whether or not the second URL 3482 associated with the identification information id is registered in the management table 3480. At this time, the second URL 3482 is registered only if the content is already downloaded and stored in the scratchpad. More specifically, the method of reading in the content from the scratchpad (for example, "scratchpad:///;pos=0") is registered. On the other hand, if the content is not stored in the scratchpad, the second URL 3482 is set to "null", which indicates that no content is registered.

At this time, if a second URL 3482 is registered, the content is read out from the scratchpad using the second URL 3482, and the content is played back. Consequently, when the two-dimensional barcode of a particular photographic print is read in for the first time, the content is downloaded via radio communications. However, when the two-dimensional barcode of the same photographic print is read in again, the content stored in the scratchpad is played back without downloading. For example, even if a child reads in the same two-dimensional barcode on the same photographic print to the mobile telephone 30 any number of times, the content is downloaded only once via radio communications, and hence it is possible to reduce the communications costs. In addition, since no time is required for radio communications, the time required from reading in the two-dimensional barcode until the start of playback of the content is short, and hence it is possible for the user to enjoy playback of the content.

Furthermore, the management table, which is used in order to judge whether or not content is stored in the storage device of the mobile telephone, is not limited to that described in FIG. 4. It may be adopted to information of different formats that the information indicates whether or not the content downloaded in association with access information read in from paper has already been stored.

Next, a second embodiment of the present invention is described below.

The service system according to the second embodiment is the similar composition to the service system according to the first embodiment described with reference to FIG. 1, and since it has been described already with respect to the first embodiment, no further explanation is given here.

Figure 6:
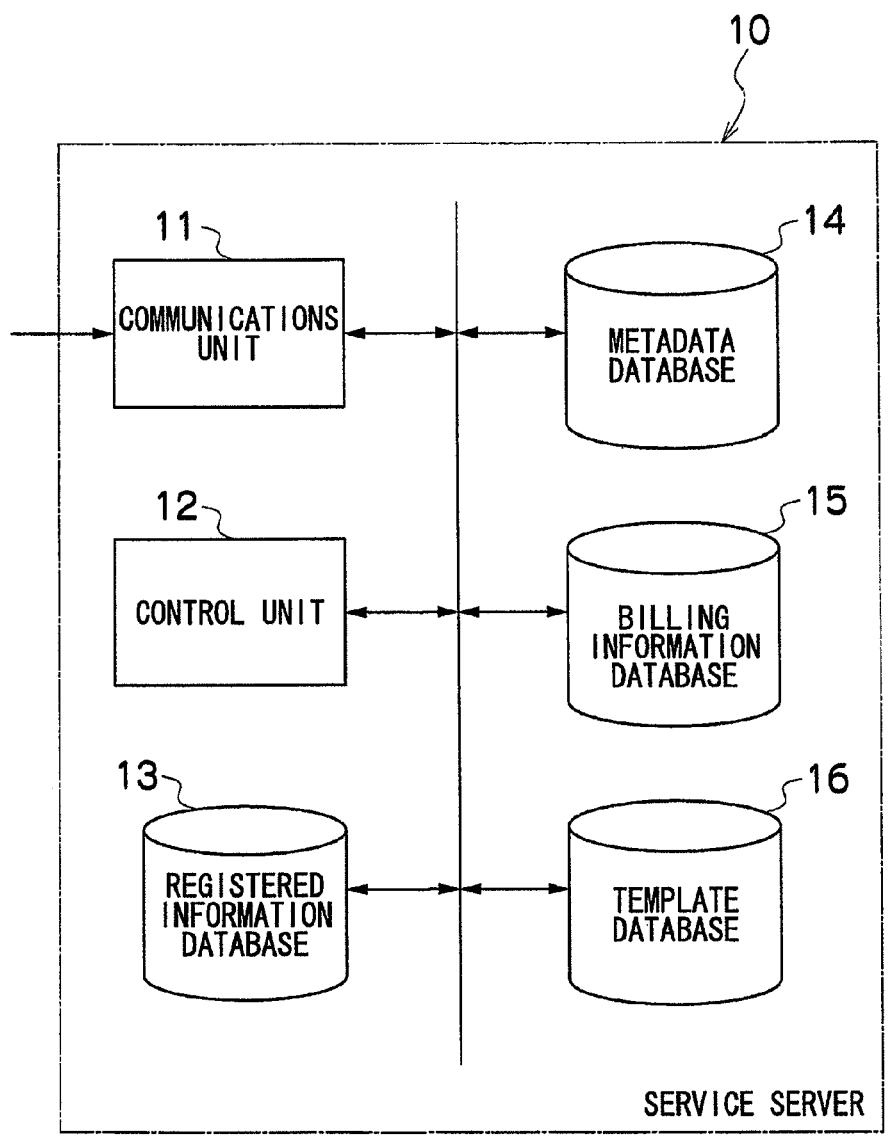
FIG. 6 is a block diagram of the specific internal composition of a server according to the embodiment.

FIG. 6 is a schematic block diagram showing an example of the internal composition of a service server 10 in a service system according to the second embodiment. As shown in FIG. 6, the service server 10 comprises: a communications unit 11 which communicates with a printer 20, mobile telephones 30 and 40; and a PC 50, via a network 60; a control unit 12 consisting of a CPU (Central Processing Unit); a registered information database 13; a metadata database 14; a billing information database 15; and a template database 16. The databases 13 through 16 need not be housed within the chassis of the service server 10, and an embodiment may be adopted wherein these databases are mounted remotely from the service server 10, and are connected with the service server 10 via the network 60 shown in FIG. 1.

The communications unit 11 communicates with the devices connected to the network 60. The communications unit 11 is able to communicate with the mobile telephones 30 and 40, and the PC 50, by HTTP (Hypertext Transfer Protocol).

The registered information database 13 manages multimedia content, such as sound information, moving image information, still image information, text information and vector graphics, and the other registered information, which is to be downloaded to the mobile telephone 30. Herein, registered information is digital content relating to an image that is to be printed (hereafter referred to simply as "content"). In addition, the registered information apart from the image to be printed may also be referred to as "additional information", and include the actual image that is to be printed. There is a case in which those items of registered information are registered by being uploaded together with the image to the service server 10 from the mobile telephone 40 or PC 50 of the user ordering the print at the time of the print order. In addition, there is also a case in which those items of registered information are registered by being uploaded to the service server 10 from the mobile telephone 40 or PC 50 of the user ordering the print after the print order. Further, there is also a case in which those items of registered information are prepared by being inputted at the server 10.

The metadata database 14 manages metadata which includes the content playback conditions (one type of playback control information) and the content update conditions (one type of update control information. The metadata 140 shown in FIG. 7 consists of the items: an "ID", a "version", a "content acquisition date", a "playback validity term", a "date/time of next update", and a "permitted frequency of playback". The "ID" (identification information) identifies the content that is managed by the registered information database 13. One identification information ID may correspond to a grouped plurality of content, in addition to one identification information ID corresponding to one content. The "ID" is used to identify an order for a print service or an order for a registration service, to identify an image to be printed, or to identify billing information. The "version" indicates the version of the application program which is required in the mobile telephones 30 and 40 in order to playback the content. The "content acquisition date" indicates the date and time (year/month/day, and hour/minute/second) at which the mobile telephone 30 acquires the content from the service server 10. The "playback validity term" indicates the valid time period during which the content can be played back. The "date/time of next update" indicates the date and time at which the content stored in the mobile telephone 30 is to be updated. The "permitted frequency of playback" indicates the remaining number of times that which the content can be played back.

When the control unit 11 receives order information for a print service or a registration service from the mobile telephone 40 or PC 50 of an ordering user, the control unit 12 registers in the registered information database 13 the image to be printed (still image information) and the registered information (content) which is related to this image, such as sound information, moving image information, text information, or the like, which are uploaded from the mobile telephone 40 or PC 50 of the ordering user. In addition, the control unit 12 creates metadata which indicates the permitted frequency of playback, the playback validity term, and other playback condition information relating to the content, as well as update condition information relating to the content. Therefore, it registers this metadata in the metadata database 14.

In addition, the control unit 12 creates designation information for recording a two-dimensional barcode onto the prescribed print medium together with the image to be printed so that the mobile telephone 30 obtains the content. Accordingly, the photographic print 26 is created by the printer 26.

Furthermore, the control unit 12 also performs a billing process with respect to the ordering user, according to the metadata. For example, the amount of the bill to be charged to the ordering user is calculated according to the size of the registered information. For example, the amount of the bill to be charged to the ordering user is calculated according to a permitted frequency of playback and a length of the playback validity time corresponding to the playback validity term.

When access information recorded on the photographic print 26 is received from the mobile telephone 30, the control unit 11 receives the access information indicated by the two-dimensional barcode from the mobile telephone 30. In addition, the communications unit 11 delivers the content and metadata corresponding to the access information, to the mobile telephone 30 forming the access source. Incidentally, if it is not necessary for delivering the content, it may also deliver only metadata to the mobile telephone 30.

When the communications unit 11 receives access information from the mobile telephone 30, the control unit 12 judges whether or not it is necessary to deliver content and metadata corresponding to the received access information. In addition, the control unit 12 searches the registered information database 13 for content corresponding to the access information, and then searches the metadata database 14 for metadata corresponding to the access information. According to the judgment result for the necessity of delivering content and metadata, if it is necessary to deliver both content and metadata, both are delivered to the access source mobile telephone 30. On the other hand, if it is necessary to deliver metadata only, only metadata is delivered to the access source mobile telephone 30.

Furthermore, the control unit 12 acquires the system date and time (current date and time information) managed by the mobile telephone 30. If the system date and time managed by the mobile telephone 30 does not match the system date and time (current date and time information) managed by the control unit 12, the mobile telephone 30 is controlled for prohibiting playback of the content. The judgment of matching date and time may be performed by judging whether or not there is coincidence up to the year, month and day, and may be performed by judging whether or not there is coincidence up to units of hours, minutes and seconds, as well as the year, month and day. More specifically, if the date and time lie within a prescribed range of tolerance, it might be judged as the coincidence of the date and time.

In the present embodiment, the order receiving device, the access information receiving device; and the delivering device according to the present invention are compose of the communications unit 11 and the control unit 12. The designation information creating device, the judgment device, and the billing device according to the present invention are composed of the control unit 12.

Herein, an example of the control of playback according to the metadata 140 shown in FIG. 7 is described. In a first example, the content is played back in the case that the current date and time does not exceed the "playback validity term". In a second example, the content is played back, in the case that the current date and time do not exceed the "playback validity term" while the "permitted frequency of playback" is "1" or greater after it is decremented by 1 for each playback of the content. In a third example, the content is played back, in the case that the value of "version" is equal to or lower than the value of the program in the mobile telephone 30.

Furthermore, to describe an example of the update control according to the metadata 140 in FIG. 7, a new content is downloaded from the service server 10 and stored, in the case that the current date and time are the "date/time of next update" or are already passed the "date/time of next update", and in the case that the current date and time do not yet exceed the "playback validity term".

Incidentally, the items of the "version", the "playback validity term", and the "permitted frequency of playback" shown in FIG. 7 are examples of playback control information according to the present invention. In addition, the "date/time of next update" shown in FIG. 7 is an example of the update control information according to the present invention.

The billing information database 15 manages the billing information corresponding to the ordering user or to an advertiser. The bill charged to the ordering user is a bill in respect of printing services, and a bill in respect of registration services.

The template database 16 manages the templates of content. For example, the template database 16 stores a frame for synthesizing with the image to printed. In addition, multimedia content according to vector graphics may also be stored, such as a voice saying "A Happy New Year", text information stating "A Happy New Year!", moving images, animated characters that move about the screen, or the like.

In the service system according to the second embodiment, the mobile telephones 30 and 40 shown in FIG. 3 have the following functions in addition to the functions described in the first embodiment.

If the content corresponding to the two-dimensional barcode is not stored in the non-volatile memory 348 when the two-dimensional barcode is read in by the camera 341, the control unit 12 receives the content and the metadata corresponding to the two-dimensional barcode from the service server 10 by means of the radio communications unit 347, and controls playback of the content thus received, according to the received metadata. On the other hand, if the content corresponding to the read two-dimensional barcode is stored in the non-volatile memory 348, the control unit 12 controls playback of the content which is stored in the non-volatile memory 348 according to the playback control information in the metadata which is stored in the non-volatile memory 348 in association with the content.

Additionally, the control unit 12 requests updating of the content from the service server 10 by means of the radio communications unit 347 according to the update control information in the metadata, and stores new content received from the service server 10 in the non-volatile memory 348. Furthermore, the control unit 12 requests updating of the metadata from the service server 10 by means of the radio communications unit 347 according to the update control information in the metadata, and stores new metadata received from the service server 10 in the non-volatile memory 348.

In the present embodiment, the playback device according to the present invention is composed of the speaker 343 and the LCD 344, the reading device according to the present invention is composed of the camera 341, the content requesting device and receiving device according to the present invention are composed of the radio communications unit 347, the storage device according to the present invention is composed of the non-volatile memory 348, and the judgment device and control device according to the present invention are composed of the control unit 349.

Next, the sequence of service processing in the service system according to the second embodiment is described below. Since there are various types of service processing, two representative examples are described in detail here.

Figure 9:
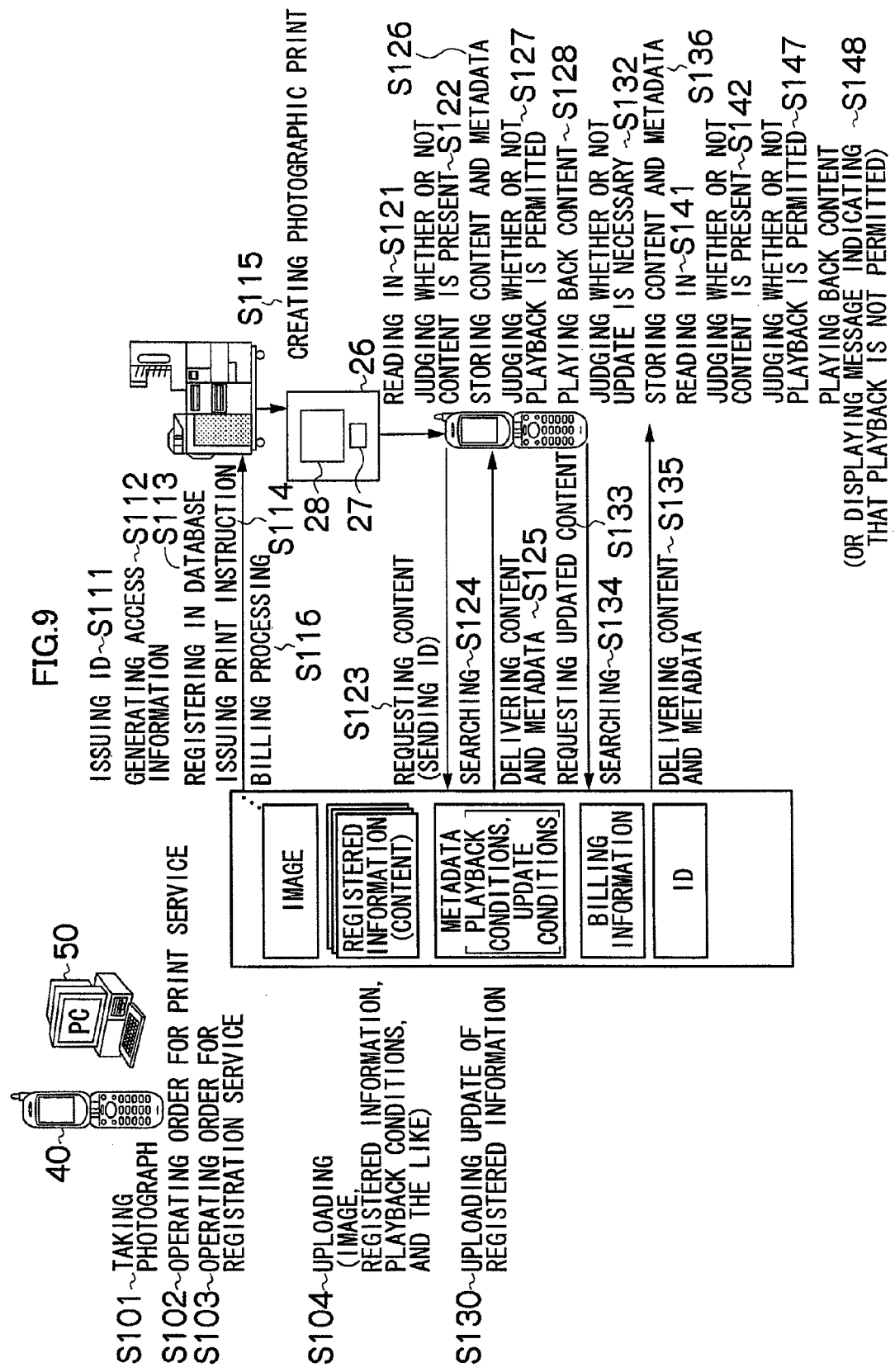
FIG. 9 is a schematic diagram showing the sequence of service processing according to a first embodiment of the present invention.

FIG. 9 is a flowchart showing a sequence of service processing according to the first embodiment.

First, as shown in FIG. 9, the ordering user photographs a subject using the mobile telephone 40 (S101). For example, when a still image is acquired by photographing, sound information inputted using the mobile telephone 40 after photographing can be added to the still image to be printed, and text information inputted using the mobile telephone 40 after photographing can also be added to the still image to be printed. When a moving image is acquired, a still image to be printed can be extracted from the moving image, sound information recorded simultaneously with the capturing of the moving image can be added to a still image to be printed, and text information inputted using the mobile telephone 40 after image capture can also be added to a still image to be printed.

Next, the ordering user performs an ordering operation for the print service by means of the mobile telephone 40 (S102).

Herein, print service is a service which creates a photographic print in which the image is printed onto a prescribed printing medium.

Specifically, an image to be printed is selected from among a plurality of still images obtained by photographing, and then the size, number, or the like of the photographic print are inputted according to requirements. At this time, a still image for printing may also be extracted from a moving image. In addition, the delivery method for the photographic print is also specified. For example, if the user ordering the print takes directly at a photographic laboratory or other specified pickup location for pickup, then the pickup location is specified. For example, if the delivery by mail, parcel service, or the like is requested by specifying a delivery destination, then the delivery destination is specified. In this case, the photograph is packaged, and is sent to the required delivery destination. In the case of a postcard, it is also possible to request delivery of the postcard itself to the required delivery destination.

At the same time, the user ordering the print also performs an ordering operation for the registration service by using the mobile telephone 40 (S103).

Herein, registration service is a service which registers the image to be printed or the content relating to the image (namely, sound information, text information, a moving image, or other registered information), in the registered information database 13, and stores same for a prescribed period of time.

For example, if a still image obtained by photographing is to be printed, then it is possible to request the registration of the still image together with sound information and text information attached to the still image. In addition, if a still image extracted from a moving image is to be printed, it is possible to request the registration, as registered information, of the still image, the moving image from which the still image has been extracted, sound information which is recorded simultaneously with capturing of the moving image, and text information inputted after image capture. Such the registered information is downloaded to the mobile telephone 30 of the user to whom the photographic print is distributed, as described hereinafter. Except for uploading and registering the registered information to the service server 10, it may also be adopted to a configuration in which desired template information is selected from among a plurality of template information items registered previously in a template database 16, and then only information for linking to the selected template is registered. For example, it may be adopted to a configuration in which multimedia content created previously as Flash (trademark) vector graphics, or the like, is selected, and then the information is registered for linking to the multimedia content thus selected.

Furthermore, the ordering user can specify the content update conditions and the content playback conditions, such as the permitted frequency of playback and the playback validity term. The relationship between the permitted frequency of playback and the billing amount is displayed on the LCD 344 of the mobile telephone 30: for example, the price in which a permitted frequency of playback is limited to ten times is displayed; and the price in which the permitted frequency of playback is limited to twenty times is displayed. Then, an operation for selecting a permitted frequency of playback is performed via the operating panel 345 by taking account of the billing amount. In addition, the relationship between the playback validity term and the billing amount, such as the price if the playback validity period continues until next month. For example, the price in which it extends until the month after next, is displayed on the LCD 344 of the mobile telephone 30. Then, an operation for selecting the playback validity term is performed via the operating panel 345 by taking account of the billing amount. Furthermore, the relationship between a permitted frequency of update and the billing amount is displayed on the LCD 344 of the mobile telephone 30. For example, the price in which the permitted frequency of update is zero is displayed, and the price in which it is one or more is displayed. Then, an operation for selecting the permitted frequency of update is performed via the operating panel 345 by taking account of the billing amount.

Next, when the user ordering the print performs a prescribed transmission operation using the mobile telephone 40, the order information is uploaded from the mobile telephone 40 to the service server 10 via the network 60 (S104). Herein, order information contains the image to be printed, the registered information (sound information, text information, moving image information, and the like), the playback conditions information, the update conditions information, and the photographic print delivery information.

Though an example of a case in which uploading is performed from the mobile telephone 40 to the service server 10 is described above, it may also be adopted to an embodiment as following: an image is captured by a digital camera (not shown in the drawings) (S101); the storage media on which the captured image is stored is inserted in the PC 50, and an order operation for the print service (S102); an order operation for the registration service (S103); and uploading of the order information to the service server 10 (S104), are performed by the PC 50.

Incidentally, uploading the registered information, the playback conditions information, and the update conditions information can be performed after the image to be printed is downloaded, except for being performed simultaneously with the uploading of the image to be printed.

Next, when the service server 10 receives the upload of the order information, identification information ID is issued in respect of each image to be printed (S111). This identification information ID is used for identifying the image to be printed, as well as for identifying the registered information downloaded to the mobile telephone 30 of the user to whom the photographic print is distributed. On the one hand, there is a case in which the identification information corresponds in a one-to-one fashion with the image to be printed. On the other hand, there is a case in which one piece of identification information corresponds to a plurality of images to be printed which are grouped together in the same print order.

Next, the service server 10 generates the access information necessary for the mobile telephone 30 of the user to whom the photographic print is distributed to acquire the registered information from the service server 10 via the network 60 (S112). Herein, access information contains a URL (Uniform Resource Locator) and identification information ID.

Next, the service server 10 registers order information (such as the registered information, playback conditions information, update conditions information, and delivery information) which is uploaded from the mobile telephone 40 or the PC 50, in the database, in association with the identification information ID. Herein, registered information is managed by the registered information database 13. The playback conditions information and the update conditions information are managed by the metadata database 14 as part of the metadata.

Next, the image to be printed and the access information are transmitted from the service server 10 to the printer 20 (S114), and then a photographic print 26 is created by the printer 20 (S115). Herein, access information is printed together with the printed image 28 on the same printing medium, in the form of a two-dimensional barcode 27.

Then, the service server 10 performs billing (S116). Herein, billing is divided into billing in respect of a print service (i.e. a service for creating a photographic print 26 bearing the image to be printed), and billing in respect of a registration service (i.e. a service for storing registered information and delivering the registered information in response to access from a mobile telephone 30).

A billing process for only the print service is performed with respect to an ordering user who has requested a print service only. More specifically, the charge varies according to the type of photographic print (normal size, postcard size, and so on), the number of prints, and whether delivery is to be made by post or by parcel service, and the like.

Additionally, a billing process for the registration service is performed in addition to a billing process for the print service, with respect to an ordering user who has requested a registration service in conjunction with a print service. More specifically, a billing process is performed in accordance with the playback conditions information (the playback validity term, the permitted frequency of playback, and the like), and the update conditions information (a frequency of update). For example, an amount is billed in accordance with the permitted frequency of playback, in such a manner that a certain amount is charged if the permitted frequency of playback is limited to ten times, and a different amount is charged if the permitted frequency of playback is limited to twenty times. For example, an amount may also be billed in accordance with the playback validity term, in such a manner that a certain amount is charged if the playback validity period continues until next month and a different amount is charged if the playback validity period continues until the month after next. For example, an amount may also be billed in accordance with the permitted frequency of update, in such a manner that a certain amount is charged if the permitted frequency of update is zero time, and a different amount is charged if it is one or more time.

Incidentally, when the playback validity term is passed, the registered information is deleted from the registered information database 13 by the service server 10.

Next, the sequence of processing according to the first embodiment is described in a case that a two-dimensional barcode 27 on a photographic print 26 is read in to a mobile telephone 30 of a user to which the photographic print 26 is distributed, and that the content is then played back.

First, the user to whom the photographic print 26 is distributed sets the user's mobile telephone 30 to a mode for reading a two-dimensional barcode, and uses the mobile telephone 30 to read the two-dimensional barcode 27 on the photographic print 26 (S121). Then, the mobile telephone 30 judges whether or not content corresponding to the two-dimensional barcode 27 is stored in the non-volatile memory 348 of the mobile telephone 30 (S122).

At this time, if content corresponding to the read two-dimensional barcode 27 is not stored in the non-volatile memory 348, then content corresponding to the two-dimensional barcode 27 is requested from the service server 10 (S123). In this case, the mobile telephone 30 sends access information containing the identification information ID (referring to as the original information of the two-dimensional barcode), to the service server 10.

Next, while the service server 10, which receives a request of content from the mobile telephone 30, searches for the content corresponding to the identification information ID, from among the content (registered information) managed by the registered information database 13, the service server 10 also searches for metadata corresponding to the identification information ID from among the metadata managed by the metadata database 14 (S124), and sends the content and the metadata to the access source mobile telephone 30 (S125).

Next, when the mobile telephone 30 receives the content and metadata, the mobile telephone 30 stores the content and metadata in mutually relating condition in the non-volatile memory 348 of the mobile telephone 30 (S126). For example, if metadata 140 having the format shown in FIG. 7 has been received, then the received metadata 140 is managed by the mobile telephone 30 within a management table 4480 as shown in FIG. 8.

In FIG. 8, the columns of an "ID", a "Version", a "Content acquisition date", a "Reproduction validity term", a "Next update date/time", a "Permitted frequency of playback" are set respectively in the details received from the service server 10 for each set of identification information ID. In addition, the original information of the two-dimensional barcode 27 is registered in association with the metadata received from the service server 10. In the present embodiment, the original information contains the URL (Uniform Resource Locator) and identification information ID necessary for the mobile telephone 30 to connect to the service server 10.

Then, the mobile telephone 30 judges whether or not playback of the content is permitted or denied, according to the received metadata (S127). At this time, if the playback is permitted, then the content received from the service server 10 is played back (S128). For example, if the two-dimensional barcode 27 of the photographic print 26 shown in FIG. 2 is read into the mobile telephone 30, sound information (for example, the voices of family members) relating to the printed image 28 (for example, a still image of a family) is outputted from the speaker 343 of the mobile telephone 30, and a moving image relating to the printed image 28 (for example, a moving image of the family) is displayed on the LCD 344 of the mobile telephone 30. Furthermore, if the display is switched by means of the operating panel 345, text information relating to the printed image 28 (for example, a text message inputted by a family member) is displayed on the LCD 344 of the mobile telephone 30.

Incidentally, the ordering user may upload the registered information (content) after ordering a print service and a registration service. Firstly, there is a case that the user uploads registered information at a later time, except for uploading the registered information when placing the order. Secondly, there is a case that the user performs an upload in order to update that registered information, regardless of having uploaded the registered information when placing the order (an update upload) (S130). When having received the registered information from the mobile telephone 40 of the ordering user or from the PC 50 of the ordering user, the service server 10 registers the registered information in the registered information database 13 in association with the identification information ID. At this time, if there is no need to change the metadata, then the metadata in the metadata database 14 is maintained in unaltered form, without being newly registered or modified.

Furthermore, the mobile telephone 30 judges whether or not the current date and time are passed the date/time of next update (S132). At this time, if it is passed the date/time of next update, then it requests the content which is registered in the registered information database 13, from the service server 10 (S133). The identification information ID is attached to this content request. While the service server 10 searches the registered information database 13 for the content corresponding to the identification information ID from among the content (i.e. the registered information) which is managed by the registered information database 13, the service server 10 searches for metadata corresponding to the identification information ID from among the metadata managed by the metadata database 14 (S134), and then sends the content and the metadata to the access source mobile telephone 30 (S135). The mobile telephone 30 stores the content and metadata which are received in non-volatile memory 348 of the Mobile telephone 30 in a mutually associated condition (S136).

After that, the two-dimensional barcode 27 on the photographic print 26 is read in to the mobile telephone 30 (S141), and then it is judged whether or not the content corresponding to the two-dimensional barcode 27 is stored in the non-volatile memory 348 of the mobile telephone 30 (S142). At this time, if the content corresponding to the two-dimensional barcode 27 is stored therein, then no request for content is made to the service server 10, and then it is judged whether or not playback of the content is to be permitted or denied, according to the metadata associated with the content that is to be played back (S147). According to this judgment result, the playback of the content is permitted or denied (S148).

For example, if the current date and time are passed the playback validity term, playback of the content is denied. Then, the mobile telephone 30 displays a message which indicates that the playback validity term is passed, on the LCD 344. In addition, if the permitted frequency of playback, which is decremented each time of playing back the content, is reached to "0", the mobile telephone 30 displays a message which indicates that the permitted frequency of playback is reached to "zero", on the LCD 344.

Figure 10:
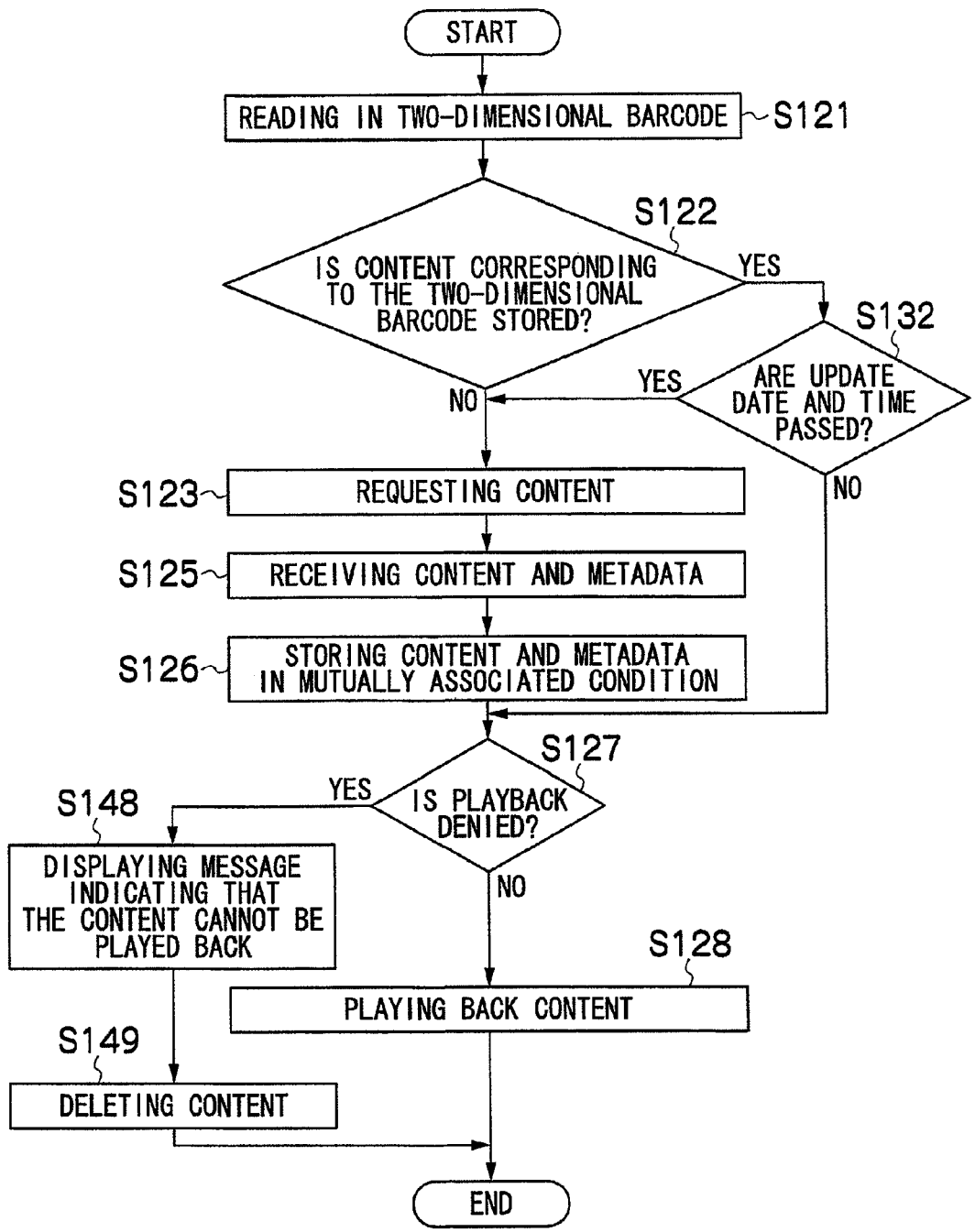
FIG. 10 is a flowchart showing the sequence of the processing of a mobile telephone in service processing according to the first embodiment.

FIG. 10 is a flowchart showing the sequence of processing performed by the mobile telephone 30 in service processing according to the first embodiment. Each of the respective steps in this process is executed by the control unit 349 in the mobile telephone 30.

First, as shown in FIG. 10, the two-dimensional barcode is read in (S121). More specifically, the two-dimensional barcode is photographed by the camera 341, and the two-dimensional barcode thus photographed is decrypted. At this time, the mobile telephone 30 judges whether or not content corresponding to the read two-dimensional barcode 27 is stored in the non-volatile memory 348 of the mobile telephone 30 (S122). More specifically, the mobile telephone 30 extracts the identification information from the original information obtained as a result of decrypting the two-dimensional barcode, and judges whether or not this identification information is registered in the management table 3480 shown in FIG. 4. At this time, the mobile telephone 30 may also judge whether or not the actual original information is registered in the management table 3480. If it is judged that the content corresponding to the read in two-dimensional barcode 27 is not stored in the non-volatile memory 348, the mobile telephone 30 requests the content from the service server 10 according to the original information of the two-dimensional barcode 27 (i.e. the access information) (S123), receives content and metadata from the service server 10 (S125), stores the content and metadata received in the non-volatile memory 348 in a mutually associated condition (S126), and then judges whether or not playback of the content is permitted according to the metadata thus received (S127). If the playback is permitted, the mobile telephone 30 playbacks the received content (S128). On the other hand, if the playback of the received content is not permitted (playback denied), the mobile telephone 30 displays a message which indicates that the content cannot be played back, on the LCD 344 (S148), and then the content is deleted from the non-volatile memory 348 (S149).

Furthermore, according to the judgment in step S122, if it is judged that the content corresponding to the two-dimensional barcode 27 is stored in the non-volatile memory 348, the mobile telephone 30 further judges whether or not updating of the content is necessary according to the metadata stored in the non-volatile memory 348 in association with the content (S132). More specifically, if the current date and time are passed the date/time of next update, it is judged that updating of the content is necessary.

If it is judged that updating of the content is necessary, the mobile telephone 30 requests the content from the service server 10 (S123). On the other hand, if it is judged that updating of the content is not necessary, the mobile telephone 30 judges whether or not playback of the content is permitted, according to the metadata stored in the non-volatile memory 348 in association with the content (S127). At this time, if playback is permitted, it playbacks the content stored in the non-volatile memory 348 (S128). If the playback is not permitted, the content is not played back, a message, which indicates that the content cannot be played back, is displayed on the LCD 344 (S148). Then, the content is deleted from the non-volatile memory 348 (S149).

Figure 11:
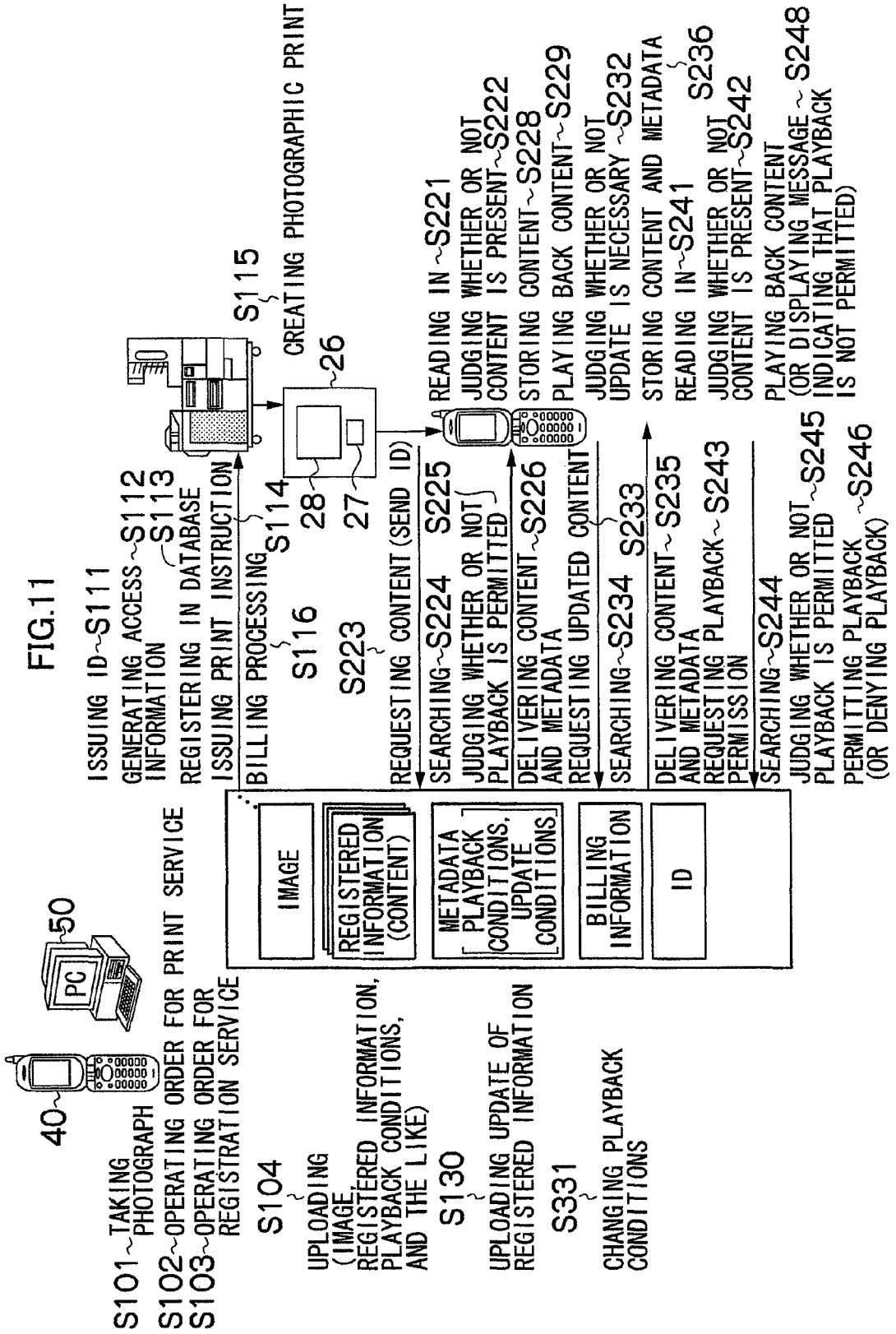
FIG. 11 is a schematic diagram showing the sequence of service processing according to a second embodiment of the present invention.

FIG. 11 is a flowchart showing a sequence of service processing according to the second embodiment.

Each of the respective steps in the process of the second embodiment is same as the following service processing of the first embodiment described above. More specifically, the process of the second embodiment comprises the steps of: uploading order information by performing prescribed operations at the mobile telephone 40 of the ordering user or the PC 50 of the ordering user (S101 through S104); issuing of an ID (S111) by the service server 10; generating access information by the service server 10 (S112); registering information in the database by the service server 10 (S113); instructing for printing by the service server 10 (114); and billing as performed by the service server 10 (S114). Furthermore, similarly to the service processing of the first embodiment, access information containing identification information ID is printed in the form of a two-dimensional barcode 27 shown in FIG. 2 on the same print medium together with the printed image 28 shown in FIG. 2, in accordance with the order information (S115).

First, the user to whom the photographic print 26 is to be delivered makes the user's mobile telephone 30 to read in the two-dimensional barcode 27 on the photographic print 26 (S221). Then, the mobile telephone 30 judges whether or not content corresponding to the two-dimensional barcode 27 is stored in the non-volatile memory 348 of the mobile telephone 30 (S222).

At this time, if content corresponding to the read two-dimensional barcode 27 is not stored in the non-volatile memory 348, the content corresponding to the two-dimensional barcode 27 is requested from the service server 10 (S223). In this case, the mobile telephone 30 sends access information including the identification information ID (namely, the original information of the two-dimensional barcode), to the service server 10. Furthermore, in the service processing according to the second embodiment, the system date and time, which are managed by the mobile telephone 30, are attached to the access information, and are sent to the service server 10.

When receiving a request for content from the mobile telephone 30, the service server 10 searches for the content corresponding to the identification information ID, from among the content (registered information) which is managed by the registered information database 13, and also searches for metadata corresponding to the identification information ID from among the metadata which is managed by the metadata database 14 (S224). Then, the service server 10 judges whether or not playback of the content is to be permitted or denied, according to the metadata thus referenced (S225). The service server 10 compares the system date and time of the mobile telephone 30, which are received from the mobile telephone 30, with the system date and time which are managed by the service server 10. At this time, if they are not matching, it judges that playback is not permitted.

On the other hand, if playback is permitted, the service server 10 sends the content and metadata to the mobile telephone 30 (S226). The mobile telephone 30, which receives the content and metadata, stores the content and metadata in a mutually associated condition in the non-volatile memory 348 of the mobile telephone 30 (S228), and then also playbacks the content received from the service server 10 (S229).

Incidentally, the ordering user may upload the registered information (content) after ordering a print service and a registration service (S130).

In the present embodiment, it is also possible to instruct for changing the playback conditions information and the playback update information of the registered content. For example, a designation that the content has not been updated when uploading the image to be printed may be changed to a designation that the content is updated, according to the user's wishes. In addition, for example, a designation that the playback validity term of the content has been the end of next month when uploading the image to be printed may be changed to a designation that playback is valid for one year, according to the user's wishes.

The service server 10 registers the registered information in the registered information database 13 in association with the identification information ID when receiving the registered information from the mobile terminal 40 or the PC 50 of the ordering user. In addition, the service server 10 registers this information as part of the metadata, in the metadata database 14, in association with the identification information ID, when receiving the playback conditions information and update conditions information from the ordering user's mobile telephone 40 or the PC 50.

Next, the mobile telephone 30 judges whether or not the current date and time are passed the date/time of next update (S232). At this time, if the mobile telephone 30 is passed the date/time of next update, the mobile telephone 30 requests the content registered in the registered information database 13, from the service server 10 (S233). In time, the identification information ID is attached to this content request. Furthermore, in the second embodiment, the system date and time managed by the mobile telephone 30 are attached to the access information, and are sent to the service server 10. While searching the registered information database 13 for the content corresponding to the identification information ID, from among the content (registered information) managed by the registered information database 13, the service server 10 further searches for metadata corresponding to the identification information ID from among the metadata managed by the metadata database 14 (S234), and then sends the content and the metadata to the access source mobile telephone 30 (S235). The service server 10 compares the system date and time of the mobile telephone 30, which are received from the mobile telephone 30, with the system date and time managed by the service server 10. At this time, if both the system date and time are not matching, the service server 10 does not perform delivery.

Next, the mobile telephone 30 stores the content and metadata thus received in non-volatile memory 348 of the mobile telephone 30 in a mutually associated condition (S236).

Then, the two-dimensional barcode 27 on the photographic print 26 is read in to the mobile telephone 30 (S241), the mobile telephone 30 judges whether or not the content corresponding to the two-dimensional barcode 27 is stored in the non-volatile memory 348 of the mobile telephone 30 (S242). If the content corresponding to the two-dimensional barcode 27 is stored in the mobile telephone 30, the mobile telephone 30 requests to the service server 10 for permission to playback the content corresponding to the two-dimensional barcode 27 (S243). In this time, the identification information ID is attached to this playback permission request.

When receiving a request for permission to playback the content from the mobile telephone 30, the service server 10 searches for the metadata corresponding to the identification information ID from among the metadata managed by the metadata database 14 (S244). The service server 10 judges whether or not playback of the content is to be permitted or denied, according to the metadata thus referenced (S245). At this time, the service server 10 sends to the mobile telephone 30 either a playback permission report or a playback denial report (S246). The service server 10 compares the system date and time of the mobile telephone 30, which are received from the mobile telephone 30, with the system date and time managed by the service server 10. Then, both the system date and time are not matching, the mobile telephone 30 judges that playback is not to be permitted.

While the mobile telephone 30 playbacks the content when receiving a playback permission report, the mobile telephone 30 does not playback the content when receiving a playback denial report, the mobile telephone 30 displays a playback denial message (S248).

FIG. 12 is a flowchart showing the sequence of processing performed by the mobile telephone 30 in service processing according to the second embodiment. Each of the respective steps in this process is executed by the control unit 349 of the mobile telephone 30.

First, as shown in FIG. 12, the two-dimensional barcode is read in by the mobile telephone (S221). Next, the mobile telephone 30 judges whether or not content corresponding to the read two-dimensional barcode 27 is stored in the non-volatile memory 348 of the mobile telephone 30 (S222). At this time, if the mobile telephone 30 judges that content corresponding to the read two-dimensional barcode 27 is not stored in the non-volatile memory 348, the mobile telephone 30 requests content from the service server 10 according to the original information of the two-dimensional barcode 27 (namely, the access information) (S223). At the same time, the service server 10 judges whether or not playback of the content is to be permitted. If the playback is to be permitted, the mobile telephone 30 receives content and metadata from the service server 10. On the other hand, if the playback is not to be permitted, the mobile telephone 30 receives a playback denial report (S225). At this time, the mobile telephone 30 judges whether or not a playback denial report is received from the service server 10 (S227). If a playback denial report is received, the mobile telephone 30 displays a playback denial message on the LCD 344, and then the content is not played back (S251). On the other hand, if content and metadata are received from the service server 10 (namely, if playback is permitted), the received content and metadata are stored in the non-volatile memory 348 in a mutually associated condition (S228), and then the received content is played back (S229).

Furthermore, according to the judgment in step S222, if it is judged that the content corresponding to the two-dimensional barcode 27 is stored in the non-volatile memory 348, the mobile telephone 30 further judges whether or not updating of the content is necessary, according to the metadata which is stored in the non-volatile memory 348 in association with the content (S232). More specifically, the mobile telephone 30 judges whether or not updating of the content is necessary when the current date and time are passed the date/time of next update. If it is judged that updating of the content is necessary, the content is requested from the service server 10 (S223). At the same time, if it is judged that updating of the content is not necessary, playback permission is requested from the service server 10, according to the original information of the two-dimensional barcode 27 (namely, the access information) (S233).

Then, the service server 10 judges whether or not playback of the content is to be permitted, and then the mobile telephone 30 receives a playback permission report or a playback denial report from the service server 10, accordingly (S246). At this time, the mobile telephone 30 judges whether or not a playback permission report or a playback denial report is received (S247). If the report is a playback denial report, the mobile telephone 30 displays a message, which indicates that the content cannot be played back, on the LCD 344 without playback of the content (S252), and then deletes the content that has been stored in the non-volatile memory 348 (S253). On the other hand, if the report is a playback permission report, the mobile telephone 30 playbacks the content stored in the non-volatile memory 348 (S248).

Incidentally, when the service server 10 sends a playback permission report to the mobile telephone 30 in response to a playback permission request which is sent from the mobile telephone 30 to the service server 10 (S243), metadata 140 may be added to this playback permission report, and may be sent from the service server 10 to the mobile telephone 30. In this case, the mobile telephone 30 can always control playback of the content according to the most recent metadata. More specifically, delivery of the content is performed only upon playback for the first time, and only the metadata is delivered when played back for a second or subsequent time. Since the volume of the metadata is small, the waiting time for the user can be shorter in comparison with a case where the content is delivered, and hence increase in communications costs can be restricted.

On the other hand, for preventing the basic charge from being generated necessarily accompanying the occurrence of communications when the content is played back, it is also possible to set the mobile telephone 30 to access the service server 10 only upon the first time that the content is played back.

As described above, the present embodiment is explained on a case where the service server 10 judges whether playback is to be permitted or denied. However, it is possible to transmit the metadata from the service server 10 to the mobile telephone 30 each time the access data is read, and to judge whether to permit or deny playback according to the metadata which is received by the service server 10 from the mobile telephone 30. More specifically, when a two-dimensional barcode is read in, the mobile telephone 30 sends the access information to the service server 10. When this access information is received, the service server 10 judges whether to send both of the content and metadata, which correspond to the identification information ID of the access information, to the mobile telephone 30, or to send only the metadata to the mobile telephone 30. For example, if the content is not stored in the mobile telephone 30 while the mobile telephone 30 requests the content, it is judged that the content and metadata are to be delivered to the mobile telephone 30. On the other hand, if the content is stored in the mobile telephone 30 while the mobile telephone 30 requests the metadata only, it is judged that only the metadata is to be delivered to the mobile telephone 30, without delivering the content. According to this judgment result, if it is necessary to deliver both of the content and metadata, both the content and metadata are delivered to the access source mobile telephone 30. If it is necessary to deliver the metadata only, only the metadata is delivered to the access source mobile telephone 30.

As described above, according to the update date and time (one of the update conditions), an example which is set by the ordering user is explained, but the present invention is not limited to those. It is also possible to establish and manage the update date and time by a content administrator at the service server 10, by using a suitable tool (program). Additionally, it is also possible to update the content at regular intervals. The content may be updated at the regular time as following: at one o'clock every afternoon, at every Monday morning, at the second day of every month, or the like, for example. In the flowcharts shown in FIG. 10 and FIG. 12, an example is described in the case that the necessity for updating is judged when the two-dimensional barcode is read in, and that new content is downloaded from the service server 10, but the present invention is not limited to those. It is also possible to download the content at a precise time, by using the system date and time of the mobile telephone, regardless of whether or not the two-dimensional barcode is read in.

Furthermore, according to examples described in the first and second embodiment, the access information is recorded on the photographic print 26 as a two-dimensional barcode, but the present invention is not limited to those configurations. The access information may also be written into an IC tag which is formed to the paper. In this case, the printer 20 is provided with a radio writing device which writes the access information by radio communications to the IC tag (i.e. RFID, referring to as Radio Frequency Identification). In addition, the mobile telephone is also provided with a radio reading device which reads the access information from the IC tag by radio communications.

Moreover, the access information may also be recorded by being embedded into the image on the photographic print 26 in the form of digital watermark information. In this case, the mobile telephone has a function for reading in digital watermark information.

As described above, the present invention is also described in relation to a case where the user's communications terminal is a mobile telephone, but the present invention is not limited to those. It may also be applied to a PDA (Personal Digital Assistant), or another communications terminal.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A system comprising:
   at least one processor, and
   a memory storing instructions configured to instruct the at least one processor to perform:
   selecting content to be played back on a content player;

receiving the selected content and metadata associated with the selected content from a server based on access information identifying the selected content if the selected content is not stored on a storage device;

storing the selected content and metadata associated with the selected content on the storage device; and playing back the selected content stored in the storage device with a playback device.

2. The system of claim 1, wherein the receiving includes judging whether the selected content is stored in the storage device to determine whether to receive the selected content from the server.

3. The system of claim 1, wherein the metadata includes at least one of a frequency of permitted playback and a validity term of playback relating to the content.

4. The system of claim 3, wherein playing back the selected content includes playing back the selected content according to the metadata.

5. The system of claim 4, wherein playing back the selected content includes playing back the selected content only if the frequency of permitted playback included in the metadata has not been exceeded.

6. The system of claim 4, wherein playing back the selected content includes playing back the selected content only if the validity term of playback in the metadata has not expired.

7. The system of claim 1, further comprising storing an indication of at least one of:

normal termination of receipt of the selected content when the selected content is completely received; or abnormal termination of receipt of the selected content when at least a portion of the selected content is not received.

8. The system of claim 1, wherein the access information includes encrypted identification information associated with the selected content.

9. The system of claim 1, further comprising determining that the selected content is not stored on the storage device when location information associated with the selected content is not registered in the storage device.

10. The system of claim 1, further comprising determining whether the storage device has capacity to store the selected content before storage of the selected content.

11. The system of claim 1, further comprising receiving updates to the selected content at a selected frequency based on update control information.

12. The system of claim 1, wherein at least one of frequency of permitted playback or a validity term of playback is specified by a user.

13. The system of claim 1, further comprising determining a price for the selected content based at least in part on at least one of frequency of permitted playback, a validity term of playback, or frequency of update.

14. A non-transitory computer storage medium storing computer-executable instructions that, when executed, cause a computer system to perform a computer-implemented method comprising:

selecting content to be played back on a content player;

receiving the selected content and metadata associated with the selected content from a server based on access information identifying the selected content if the selected content is not stored on a storage device;

storing the selected content and metadata associated with the selected content on the storage device; and playing back the selected content stored in the storage device with a playback device.

15. The non-transitory computer storage medium of claim 14, wherein the receiving includes judging whether the selected content is stored in the storage device to determine whether to receive the selected content from the server.

16. The non-transitory computer storage medium of claim 14, wherein the metadata includes at least one of a frequency of permitted playback and a validity term of playback relating to the content.

17. The non-transitory computer storage medium of claim 16, wherein playing back the selected content includes playing back the selected content according to the metadata.

18. The non-transitory computer storage medium of claim 17, wherein playing back the selected content includes playing back the selected content only if the frequency of permitted playback included in the metadata has not been exceeded.

19. The non-transitory computer storage medium of claim 17, wherein playing back the selected content includes playing back the selected content only if the validity term of playback in the metadata has not expired.

20. The non-transitory computer storage medium of claim 14, further comprising storing an indication of at least one of:

normal termination of receipt of the selected content when the selected content is completely received; or abnormal termination of receipt of the selected content when at least a portion of the selected content is not received.

* * * * *